United States Patent
Nogami et al.

(10) Patent No.: US 10,021,675 B2
(45) Date of Patent: Jul. 10, 2018

(54) TERMINAL DEVICE, BASE STATION DEVICE, AND COMMUNICATION METHOD

(71) Applicant: SHARP KABUSHIKI KAISHA, Osaka-shi, Osaka (JP)

(72) Inventors: Toshizo Nogami, Osaka (JP); Katsunari Uemura, Osaka (JP); Shoichi Suzuki, Osaka (JP); Tatsushi Aiba, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 212 days.

(21) Appl. No.: 14/900,487

(22) PCT Filed: Jun. 24, 2014

(86) PCT No.: PCT/JP2014/066712
§ 371 (c)(1),
(2) Date: Dec. 21, 2015

(87) PCT Pub. No.: WO2014/208560
PCT Pub. Date: Dec. 31, 2014

(65) Prior Publication Data
US 2016/0157223 A1    Jun. 2, 2016

(30) Foreign Application Priority Data

Jun. 26, 2013   (JP) ................................. 2013-133401

(51) Int. Cl.
*H04W 72/04* (2009.01)
*H04W 16/32* (2009.01)
(Continued)

(52) U.S. Cl.
CPC ......... *H04W 72/0413* (2013.01); *H04L 5/001* (2013.01); *H04L 5/0053* (2013.01);
(Continued)

(58) Field of Classification Search
CPC ......... H04W 72/0413; H04W 72/0446; H04W 72/1284; H04W 24/10; H04W 16/32;
(Continued)

(56) References Cited

U.S. PATENT DOCUMENTS

| | | | |
|---|---|---|---|
| 2012/0140708 A1* | 6/2012 | Choudhury | H04W 72/082 370/328 |
| 2015/0029964 A1* | 1/2015 | Seo | H04L 1/0027 370/329 |

FOREIGN PATENT DOCUMENTS

| | | |
|---|---|---|
| WO | WO 2012/176602 A1 | 12/2012 |
| WO | WO 2013/066085 A1 | 5/2013 |

OTHER PUBLICATIONS

Alcatel-Lucent, Alcatel-Lucent Shanghai Bell, "Remaining details of Multi-cell HARQ-ACK and Periodic CSI Multiplexing for PUCCH format 3", 3GPP TSG RAN WG1 Meeting #70bis, R1-124405, Oct. 8-12, 2012.
(Continued)

*Primary Examiner* — Thai Nguyen
(74) *Attorney, Agent, or Firm* — Birch, Stewart, Kolasch & Birch, LLP

(57) ABSTRACT

A terminal device that uses a first serving cell group including a primary cell has a higher layer control information acquisition unit that configures a second serving cell group not including the primary cell, a channel state information generation unit that calculates respective pieces of periodic channel state information of serving cells, an uplink control information generation unit that generates uplink control information by dropping reports of the periodic channel state information other than one thereof in a case where the reports of plural serving cells in the first serving cell group collide with each other in one subframe and by dropping the reports of the periodic channel state information other than one thereof in a case where the reports of plural serving cells (Continued)

in the second serving cell group collide with each other in one subframe, and an uplink control information transmission unit that transmits an uplink subframe including the uplink control information. The channel state information is thereby efficiently shared regardless of a backhaul speed.

8 Claims, 10 Drawing Sheets

(51) Int. Cl.
*H04W 24/10* (2009.01)
*H04L 12/24* (2006.01)
*H04L 5/00* (2006.01)
*H04W 72/12* (2009.01)
*H04W 88/02* (2009.01)
*H04W 88/08* (2009.01)

(52) U.S. Cl.
CPC ......... *H04L 41/0803* (2013.01); *H04W 16/32* (2013.01); *H04W 24/10* (2013.01); *H04W 72/0446* (2013.01); *H04W 72/1284* (2013.01); *H04W 72/1226* (2013.01); *H04W 88/02* (2013.01); *H04W 88/08* (2013.01)

(58) Field of Classification Search
CPC . H04W 88/02; H04W 88/08; H04W 72/1226; H04L 5/0053; H04L 5/001; H04L 41/0803
See application file for complete search history.

(56) References Cited

OTHER PUBLICATIONS

Lte Advanced, "3rd Generation Partnership Project; Technical Specification Group Radio Access Network; Evolved Universal Terrestrial Radio Access (E-UTRA); Physical layer procedures", (Release 11), Technical Specification, 3GPP TS 36.213 V11.2.0 (Feb. 2013).

NTT Docomo, Inc. "Deployment scenarios and design goals for dual connectivity", 3GPP TSG-RAN WG2 #81, R2-130444, St. Julian's, Malta, Jan. 28-Feb. 1, 2013.

CATT, Miscellaneous Corrections for TS36.213 (Online), 3GPP TSG-RAN WG1#65 R1-111947, Barcelona, Spain, Internet <URL:http://www.3gpp.org/ftp/tsg_ran/WG1_RL1/ TSGR1_111947.zip>, May 11, 2011, section 7.2.2.

* cited by examiner

TERMINAL DEVICE, BASE STATION DEVICE, AND COMMUNICATION METHOD

TECHNICAL FIELD

The embodiments of the present invention relate to techniques for a terminal device, a base station device, and a communication method that realize efficient sharing of channel state information.

This application claims priority from Japanese Patent Application No. 2013-filed on Jun. 26, 2013, the disclosure of which is incorporated herein by reference.

BACKGROUND ART

In the 3rd Generation Partnership Project (3GPP) as a standardization project, the Evolved Universal Terrestrial Radio Access (hereinafter referred to as EUTRA) that has realized high-speed communication has been standardized by employment of orthogonal frequency-division multiplexing (OFDM) communication scheme and flexible scheduling by prescribed frequency and time units that are referred to as resource block.

Further, the 3GPP has realized further high-speed data transmission and has been discussing Advanced EUTRA that is upper compatible with EUTRA. As for EUTRA, a communication system is based on a network in which base station devices are formed in almost the same cell configuration (cell size). However, as for Advanced EUTRA, a communication system has been discussed, which is based on a network (heterogeneous network) in which base station devices (cells) with different configurations are intermingled in the same area.

In a communication system as the heterogeneous network in which cells with a large cell radius (macrocell) and cells with a smaller cell radius than the macrocell (small cell) are arranged, a dual connectivity technique has been discussed, in which a terminal device simultaneously connects with the macrocell and the small cell and performs communication (NPL 1).

NPL 1 discusses a network on the presupposition that backbone lines (backhaul) between the macrocell and the small cell are at a low speed and delay occurs when the terminal device attempts to realize the dual connectivity between the cell with a large cell radius (cell size) (macrocell) and a cell with a small cell radius (small cell (or picocell)). That is, it may become unfeasible or difficult to realize functions that are realized in related art due to delay of interchange of control information or user information between the macrocell and the small cell.

Further, NPL 2 discloses a method of feeding back channel state information in the cell when the terminal device simultaneously connects with plural cells that are coupled together by high-speed backhaul.

CITATION LIST

Non Patent Document

[NON PATENT DOCUMENT 1] R2-130444, NTT DOCOMO, 3GPP TSG RAN2#81, Jan. 28-Feb. 1, 2013.
[NON PATENT DOCUMENT 2] 3rd Generation Partnership Project; Technical Specification Group Radio Access Network; Evolved Universal Terrestrial Radio Access (E-UTRA); Physical layer procedures (Release 10), February, 2013, 3GPP TS 36.213 V11.2.0 (2013-2).

DISCLOSURE OF THE INVENTION

Problems to be Solved by the Invention

The terminal device may feed back channel state information in the cell to the base station device when the terminal device simultaneously connects with the plural cells that are coupled together by the high-speed backhaul. However, because sharing of information between the cells is restricted in a case of using the dual connectivity based on low-speed backhaul, a feedback method of channel state information in related art may not be used without change.

The embodiments of the present invention have been made in consideration of the above situation, and an object thereof is to provide a terminal device, a base station device, a communication system, and a communication method that may efficiently share channel state information regardless of a backhaul speed.

Means for Solving the Problems (1) To achieve the above object, measures described below are employed in the present invention. That is, a terminal device according to one aspect of the present invention is a terminal device that uses a first serving cell group which is a serving cell group which includes a primary cell, the terminal device including: a higher layer control information acquisition unit that configures a second serving cell group which is a serving cell group which does not include the primary cell; a channel state information generation unit that calculates respective pieces of periodic channel state information of plural serving cells; an uplink control information generation unit that generates uplink control information by dropping the pieces of periodic channel state information other than one piece thereof in a case where reports of the periodic channel state information of the plural serving cells in the first serving cell group among the plural serving cells collide with each other in one subframe and by dropping the pieces of periodic channel state information other than one thereof in a case where reports of the periodic channel state information of the plural serving cells in the second serving cell group among the plural serving cells collide with each other in one subframe; and an uplink control information transmission unit that transmits an uplink subframe which includes the uplink control information.

(2) Further, the terminal device according to one aspect of the present invention is the above-described terminal device, in which the higher layer control information acquisition unit may acquire higher layer control information and configure the second serving cell group based on the higher layer control information.

(3) Further, the terminal device according to one aspect of the present invention is the above-described terminal device, in which the plural serving cells may include serving cells that belong to the first serving cell group and serving cells that belong to the second serving cell group.

(4) Further, the terminal device according to one aspect of the present invention is the above-described terminal device, in which the uplink control information transmission unit may transmit the uplink subframe that includes the uplink control information in the serving cell with the smallest cell index among the serving cells which belong to the same serving cell group as the serving cells whose reports of periodic channel state information collide with each other.

(5) Further, the terminal device according to one aspect of the present invention is the above-described terminal device, in which the uplink control information generation unit may generate the uplink control information by dropping the pieces of periodic channel state information other than the piece of periodic channel state information of the serving cell with the smallest cell index among the serving cells whose reports of the periodic channel state information collide with each other.

(6) Further, a base station device according to one aspect of the present invention is a base station device that uses a first serving cell group which is a serving cell group which includes a primary cell, the base station device including: a higher layer control information notification unit that configures a second serving cell group which is a serving cell group which does not include the primary cell; an uplink control information reception unit that receives an uplink subframe; and an uplink control information extraction unit that extracts uplink control information which includes only one piece of periodic channel state information among pieces of periodic channel state information which collide with each other in a case where reports of the periodic channel state information of two or more serving cells that belong to the first serving cell group collide with each other in the one uplink subframe.

(7) Further, a base station device according to one aspect of the present invention is a base station device that communicates with a terminal device together with a master base station device, the base station device including: a backhaul processing unit that acquires configuration information about the terminal device from the master base station device; an uplink control information reception unit that receives an uplink subframe; and an uplink control information extraction unit that extracts uplink control information which includes only one piece of periodic channel state information among pieces of periodic channel state information which collide with each other in a case where reports of the periodic channel state information of two or more serving cells that belong to a second serving cell group which is a serving cell group which does not include a primary cell collide with each other in the one uplink subframe.

(8) A base station device according to one aspect of the present invention is a base station device that is a first base station device which uses a first serving cell group which is a serving cell group which includes a primary cell among plural base station devices each of which communicates with a terminal device by using one or more serving cells, in which at least any of the plural base station devices has a higher layer control information notification unit that configures a second serving cell group which is a serving cell group which does not include the primary cell, and the first base station device has an uplink control information reception unit that receives an uplink subframe, and an uplink control information extraction unit that extracts uplink control information which includes only one piece of periodic channel state information among pieces of periodic channel state information which collide with each other in a case where reports of the periodic channel state information of two or more serving cells that belong to the first serving cell group collide with each other in the one uplink subframe.

(9) Further, the base station device according to one aspect of the present invention is the above-described base station device, in which the uplink control information extraction unit may extract the uplink control information in the uplink subframe of the serving cell with the smallest cell index among the serving cells that belong to the same serving cell group as the serving cells whose reports of periodic channel state information collide with each other.

(10) Further, the base station device according to one aspect of the present invention is the above-described base station device, in which the uplink control information extraction unit may extract the uplink control information that includes only the periodic channel state information of the serving cell with the smallest cell index among the serving cells whose reports of the periodic channel state information collide with each other.

(11) Further, a communication method according to one aspect of the present invention is a communication method that is executed in a terminal device which uses a first serving cell group which is a serving cell group which includes a primary cell, the communication method including: a step of configuring a second serving cell group which is a serving cell group which does not include the primary cell; a step of calculating respective pieces of periodic channel state information of plural serving cells; a step of generating uplink control information by dropping the pieces of periodic channel state information other than one piece thereof in a case where reports of the periodic channel state information of the plural serving cells in the first serving cell group among the plural serving cells collide with each other in one subframe and by dropping the pieces of periodic channel state information other than one thereof in a case where reports of the periodic channel state information of the plural serving cells in the second serving cell group among the plural serving cells collide with each other in one subframe; and a step of transmitting an uplink subframe which includes the uplink control information.

(12) Further, a communication method according to one aspect of the present invention is a communication method that is executed in a base station device which uses a first serving cell group which is a serving cell group which includes a primary cell, the communication method including: a step of configuring a second serving cell group which is a serving cell group which does not include the primary cell; a step of receiving an uplink subframe; and a step of extracting uplink control information which includes only one piece of periodic channel state information among pieces of periodic channel state information which collide with each other in a case where reports of the periodic channel state information of two or more serving cells that belong to the first serving cell group collide with each other in the one uplink subframe.

(13) Further, a communication method according to one aspect of the present invention is a communication method that is executed in a base station device which communicates with a terminal device together with a master base station device, the communication method including: a step of acquiring configuration information about the terminal device from the master base station device; a step of receiving an uplink subframe; and a step of extracting uplink control information which includes only one piece of periodic channel state information among pieces of periodic channel state information which collide with each other in a case where reports of the periodic channel state information of two or more serving cells that belong to a second serving cell group which is a serving cell group which does not include a primary cell collide with each other in the one uplink subframe.

Effects of the Invention

The embodiments of the present invention enable channel state information to be efficiently shared regardless of a backhaul speed.

MODE FOR CARRYING OUT THE INVENTION

First Embodiment

A first embodiment of the present invention will hereinafter be described. A description will be made with a communication system (cellular system) in which a base station device (base station, node B, or eNB) and a terminal device (terminal, mobile station, user device, or UE) communicate with each other in a cell.

A description will be made about main physical channels and physical signals that are used in EUTRA and advanced EUTRA. A channel means a medium that is used for transmission of a signal, and a physical channel means a physical medium that is used for transmission of a signal. In this embodiment, a physical channel is synonymously used with a signal. In EUTRA and Advanced EUTRA, physical channels may be added, and structures and format types thereof may be changed or added in the future. However, the descriptions of this embodiment are not influenced even in a case where the change or addition is made.

Scheduling of the physical channels or physical signals is managed by using radio frames in EUTRA and Advanced EUTRA. A single radio frame is 10 ms, and the single radio frame is configured with 10 subframes. In addition, the single subframe is configured with 2 slots (that is, the single subframe is 1 ms, and the single slot is 0.5 ms). Further, the scheduling is managed by using a resource block as a minimum unit of the scheduling in which the physical channels are allocated. The resource block is defined by a certain frequency domain that is configured with a set of plural subcarriers (for example, 12 subcarriers) on a frequency axis and by a domain that is configured with a certain transmission time interval (1 slot).

Figure 1:
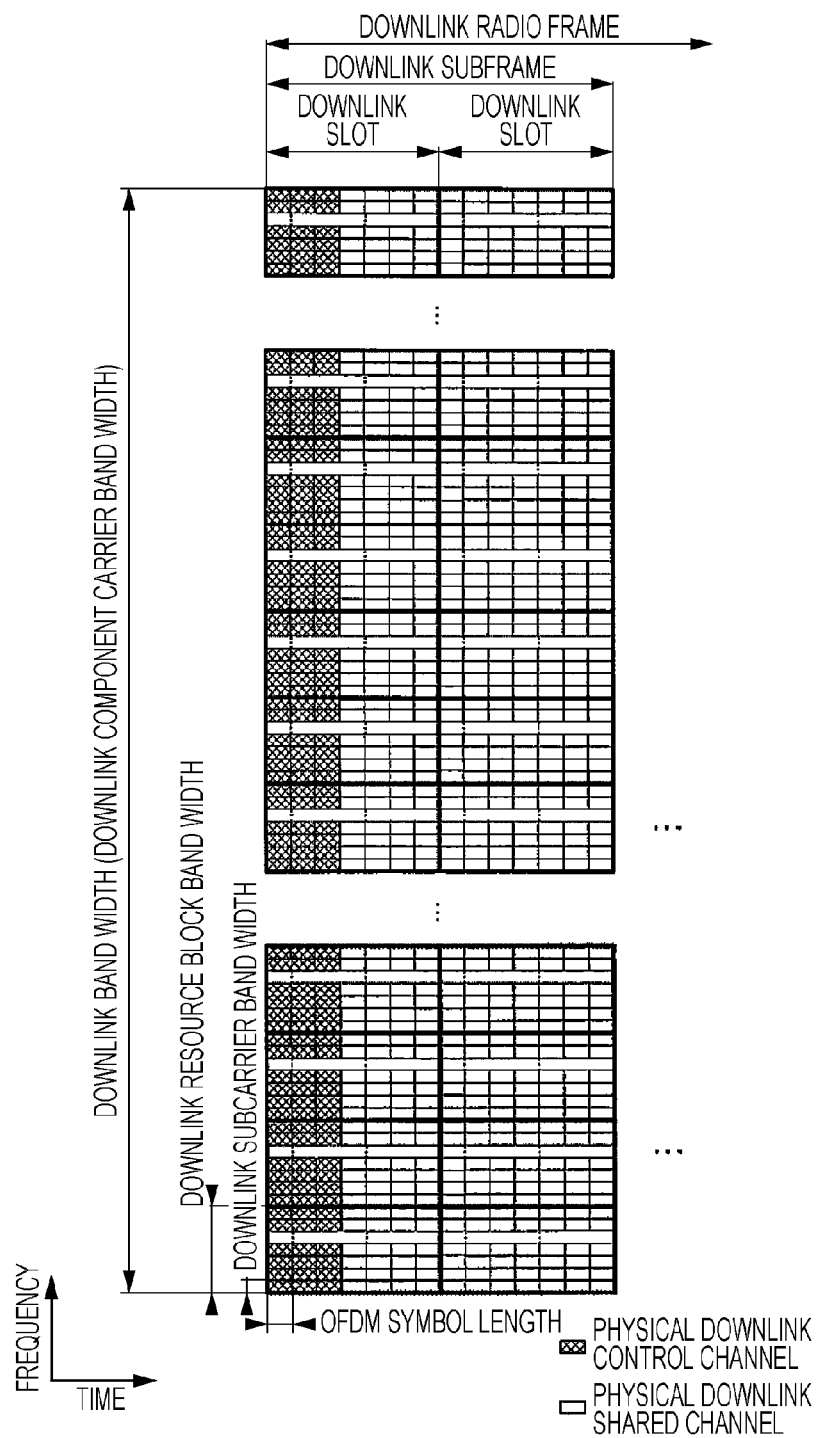
FIG. 1 is a diagram that illustrates one example of a downlink radio frame configuration according to a first embodiment.

FIG. 1 is a diagram that illustrates one example of a downlink radio frame configuration according to this embodiment. An OFDM access scheme is used for the downlink. A PDCCH, an EPDCCH, a physical downlink shared channel (PDSCH), and so forth are allocated to the downlink. The downlink radio frame is configured with a downlink resource block (RB) pair. This downlink RB pair is a unit of allocation or the like of downlink radio resources and is formed with a frequency band of a given width (RB band width) and a time duration (two slots=one subframe). A single downlink RB pair is configured with two continuous downlink RBs (RB band width □ slot) in the time domain. A single downlink RB is configured with 12 subcarriers in the frequency domain. Further, as for the time domain, the single downlink RB is configured with seven OFDM symbols in a case where a usual cyclic prefix is added and configured with six OFDM symbols in a case where a cyclic prefix longer than usual is added. A region that is specified by one subcarrier in the frequency domain and by one OFDM symbol in the time domain is referred to as resource element (RE). A physical downlink control channel is a physical channel for transmitting downlink control information such as a terminal device identifier, scheduling information of a physical downlink shared channel, scheduling information of a physical uplink shared channel, a modulation scheme, a coding rate, a retransmission parameter, and so forth. Here, a downlink subframe in a single component carrier (CC) is described. However, a downlink subframe is specified for each CC, and the downlink subframes are almost synchronized among the CCs.

Although not illustrated here, synchronization signals, a physical broadcast channel, and a downlink reference signal (RS) may be allocated to the downlink subframe. The downlink reference signals may include a cell-specific RS (CRS) that is transmitted by the same transmission port as the PDCCH, a channel state information reference signal (CSI-RS) that is used for measurement of channel state information (CSI), a terminal-specific reference signal (UE-specific RS (URS)) that is transmitted by the same transmission port as a portion of the PDSCHs, a demodulation RS (DMRS) that is transmitted by the same transmission port as the EPDCCH. Further, the downlink subframe may be a carrier to which the CRS is not allocated. In this case, similar signals (referred to as enhanced synchronization signal) to the signals that correspond to a portion of the transmission ports (for example, only a transmission port 0) or all the transmission ports of the CRS may be inserted into a portion of the subframes (for example, the first and sixth subframes in the radio frame) as signals for tracking the time and/or frequency.

Figure 2:
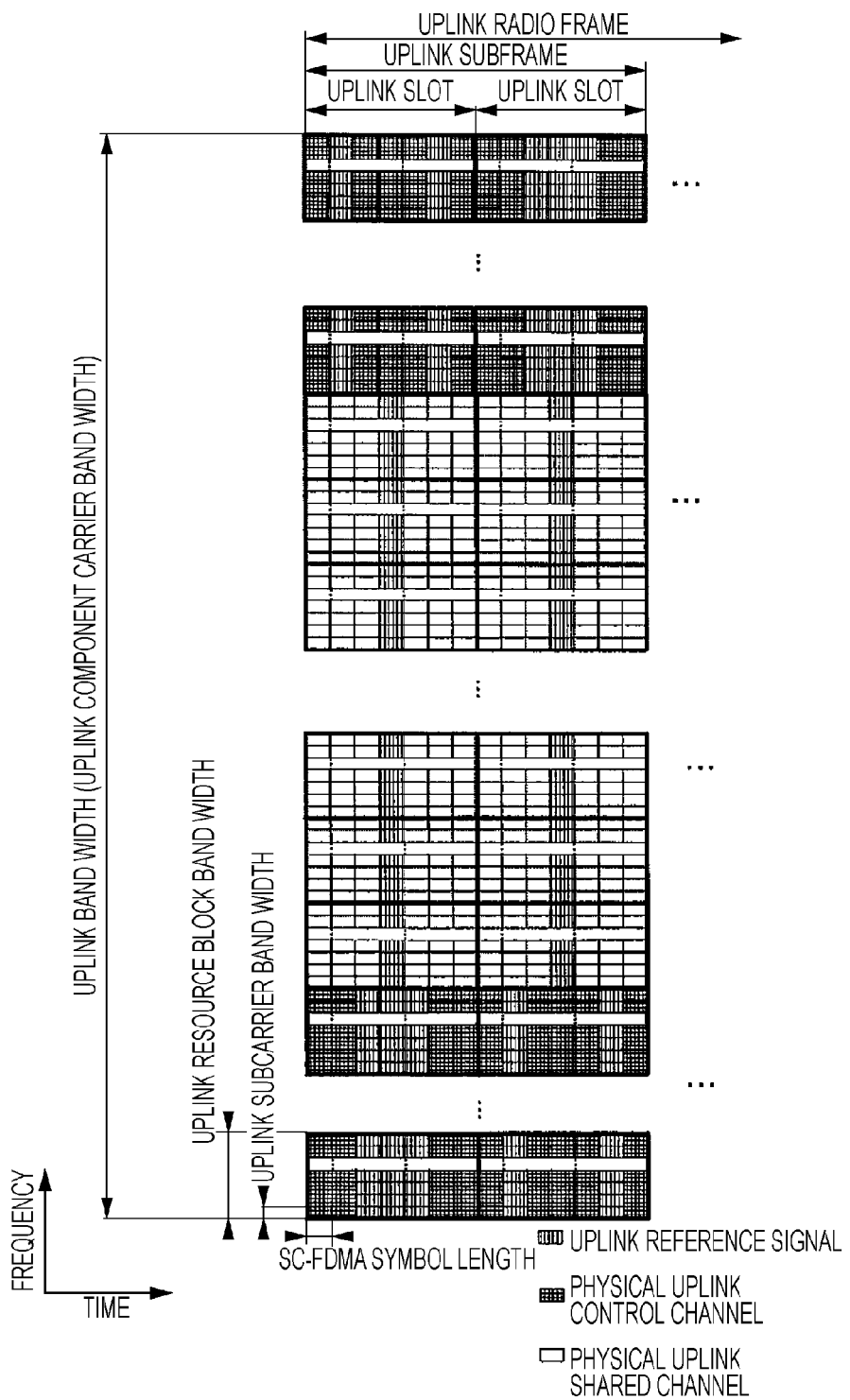
FIG. 2 is a diagram that illustrates one example of an uplink radio frame configuration according to the first embodiment.

FIG. 2 is a diagram that illustrates one example of an uplink radio frame configuration according to this embodiment. An SC-FDMA scheme is used for the uplink. A physical uplink shared channel (PUSCH), a PUCCH, and so forth are allocated to the uplink. Further, an uplink reference signal is allocated to a portion of the PUSCH and PUCCH. The uplink radio frame is configured with an uplink RB pair. This uplink RB pair is a unit of allocation or the like of uplink radio resources and is formed with a frequency band of a given width (RB band width) and a time duration (two slots=one subframe). A single uplink RB pair is configured with two continuous uplink RBs (RB band width □ slot) in the time domain. The single uplink RB is configured with 12 subcarriers in the frequency domain. As for the time domain, the single uplink RB is configured with seven SC-FDMA symbols in a case where a usual cyclic prefix is added and configured with six SC-FDMA symbols in a case where a cyclic prefix longer than usual is added. Here, an uplink subframe in a single CC is described. However, an uplink subframe is specified for each CC.

Synchronization signals are configured with three kinds of primary synchronization signals and secondary synchronization signals configured with 31 kinds of codes that are alternately allocated in the frequency domain. Signal combinations of the primary synchronization signals and the secondary synchronization signals represent 504 patterns of cell identifiers (physical cell identity (physical cell ID; PCI)) for identifying the base station devices and frame timings for radio synchronization. The terminal device identifies the physical cell ID of the synchronization signal that is received by a cell search.

The physical broadcast channel (PBCH) is transmitted to notify (configure) control parameters (broadcast information (system information)) that are in common used by the terminal devices in the cell. The radio resource by which the broadcast information is transmitted by the physical downlink control channel is notified to the terminal devices in the cell. As for the broadcast information that is not notified by the physical broadcast channel, a layer 3 message (system information) that notifies the broadcast information by the physical downlink shared channel is transmitted in the notified radio resource.

As the broadcast information, a cell global identifier (CGI) that indicates the identifier of an individual cell, a tracking area identifier (TAI) that manages a waiting area for paging, random access configuration information (transmission timing timer or the like), common radio resource configuration information in the concerned cell, peripheral cell information, uplink access restriction information, and so forth are notified.

Downlink reference signals are categorized into plural types in accordance with uses thereof. For example, the cell-specific reference signals (cell-specific RS) are pilot signals that are transmitted to the cells with prescribed power and are the downlink reference signals that are periodically repeated in the frequency domain and the time domain based on a prescribed rule. The terminal device measures the reception qualities of the cells by receiving the cell-specific RSs. Further, the terminal device uses the cell-specific RSs as reference signals for demodulation of the physical downlink control channel or the physical downlink shared channel that are simultaneously transmitted with the cell-specific RSs. Sequences that are identifiable with the cells are used as the sequences used for the cell-specific RSs.

Further, the downlink reference signals are used for estimation of a propagation fluctuation in the downlink. Downlink reference signals that are used for estimation of a propagation fluctuation are referred to as channel state information reference signals (CSI-RSs). Further, the downlink reference signals that are configured for the individual terminal devices are referred to as UE specific reference signals (URS), demodulation reference signal (DMRS), or dedicated RS (DRS) and are referred to for a channel compensation process for the channel in a case of demodulating an enhanced physical downlink control channel or the physical downlink shared channel.

The physical downlink control channels (PDCCH) are transmitted with several OFDM symbols (for example, one to four OFDM symbols) from the heads of the subframes. The enhanced physical downlink control channel (EPDCCH) is the physical downlink control channel that is allocated to the OFDM symbol to which the physical downlink shared channel PDSCH is allocated. The PDCCH or EPDCCH is used for the purpose of notifying the terminal device of radio resource assignment information in accordance with the scheduling by the base station device and information indicating an adjustment amount of an increase or decrease in transmission power. Hereinafter, the simple description of physical downlink control channel (PDCCH) means both physical channels of the PDCCH and the EPDCCH unless otherwise stated.

It is necessary that the terminal device monitors the physical downlink control channel addressed to the own device before transmission and reception of a layer 2 message and the layer 3 message (paging, handover command, and so forth) that are downlink data or higher layer control information, receives the physical downlink control channel addressed to the own device, and thereby obtains the radio resource assignment information that is referred to as uplink grant in transmission and as downlink grant (downlink assignment) in reception from the physical downlink control channel. The physical downlink control channel may be configured to be transmitted in a region of the resource block that is individually (dedicatedly) assigned from the base station device to the terminal device, other than the transmission by the above-described OFDM symbols.

The physical uplink control channel (PUCCH) is used for acknowledgement or negative acknowledgement (ACK or NACK) of downlink data and downlink channel state information (CSI) that are transmitted by the physical downlink shared channel and used for performing a request of uplink radio resource assignment (radio resource request and a scheduling request (SR)).

The CSI includes a channel quality indicator (CQI), a precoding matrix indicator (PMI), a precoding type indicator (PTI), and a rank indicator (RI), which may be used for indicating (expressing) preferable modulation scheme and coding rate, a preferable precoding matrix, a preferable PMI type, and a preferable rank, respectively. The indicators may be expressed as indications. Further, the CQI and the PMI are categorized into wideband CQI and PMI that are oriented toward transmission by using all the resource blocks in one cell and sub-band CQI and PMI that are oriented toward transmission by using a portion of contiguous resource blocks (sub-bands) in one cell. Further, among the PMIs, the PMI of the type that expresses one preferable precoding matrix by using two kinds of PMIs of a first PMI and a second PMI is present, other than the PMI of the usual type that expresses one preferable precoding matrix by one PMI.

The physical downlink shared channel (PDSCH) is also used for notifying the terminal device of the broadcast information (system information) that is not notified by the paging or the physical broadcast channel as the layer 3 message, other than the downlink data. The radio resource assignment information of the physical downlink shared channel is indicated by the physical downlink control channel. The physical downlink shared channel is transmitted while being allocated to the OFDM symbol other than the OFDM symbol for transmitting the physical downlink control channel. That is, the downlink shared channel and the physical downlink control channel are multiplexed in one subframe by time-division multiplexing.

The physical uplink shared channel (PUSCH) mainly transmits uplink data and uplink control information and may contain uplink control information such as the CSI, ACK, and NACK. Further, the physical uplink shared channel is also used for notifying the layer 2 message and the layer 3 message as the higher layer control information from the terminal device to the base station device, other than the uplink data. Further, similarly to the downlink, the radio resource assignment information of the physical uplink shared channel is indicated by the physical downlink control channel.

The uplink reference signal (also referred to as uplink pilot signal or uplink pilot channel) includes the demodulation reference signal (DMRS) that the base station device uses for demodulating the physical uplink control channel PUCCH and/or the physical uplink shared channel PUSCH and a sounding reference signal (SRS) that the base station device uses mainly for estimating an uplink channel state. Further, the sounding reference signal includes a periodic sounding reference signal (periodic SRS) that is periodically transmitted and an aperiodic sounding reference signal (aperiodic SRS) that is transmitted when the base station device gives an instruction.

A physical random access channel (PRACH) is a channel that is used for notifying (configuring) a preamble sequence and has a guard time. The preamble sequence is configured to notify the base station device of information by plural sequences. For example, in a case where 64 kinds of sequences are prepared, information of 6 bits may be indicated to the base station device. The physical random access channel is used as an access means by which the terminal device accesses the base station device.

The terminal device uses the physical random access channel for requesting an uplink radio resource in a case where the physical uplink control channel for the SR is not yet configured or for requesting transmission timing adjustment information (also referred to as timing advance (TA) command) that is necessary for making an uplink transmission timing correspond to a reception timing window of the base station device from the base station device. Further, the base station device may request the terminal device to start a random access procedure by using the physical downlink control channel.

The layer 3 message is a message that is dealt with by a protocol of a control-plane (C-plane (CP)) which is interchanged in a radio resource control (RRC) layer of the terminal device and the base station device and may synonymously be used with RRC signaling or RRC message. Differently from the control-plane, a protocol that deals with user data (uplink data and downlink data) is referred to as user-plane (U-plane (UP)). Here, a transport block that is transmission data in a physical layer contains a message of the C-plane and data of the U-plane in the higher layer. Detailed descriptions of the other physical channels will not be made.

Ranges in which communication by the frequencies controlled by the base station device is feasible (communication area) are regarded as the cells. Here, the communication areas covered by the base station device may have different dimensions and different shapes in accordance with the frequencies. Further, the frequencies may cover different areas. A radio network in which cells of different kinds of base station devices and with different sizes of cell radii are intermingled in the area of the same frequency and/or areas of different frequencies to form one communication system is referred to as heterogeneous network.

The terminal device operates while regarding the inside of the cell as the communication area. In a case where the terminal device moves from a certain cell to another cell, the terminal device moves to another appropriate cell by a cell reselection procedure while radio connection is not established (while not communicating) and by a handover procedure while radio connection is established (while communicating). An appropriate cell generally indicates a cell in which an access of the terminal device is determined as not inhibited based on information indicated by the base station device and in which the downlink reception quality satisfies a prescribed condition.

Further, the terminal device and the base station device may apply a technique in which frequencies (component carriers or frequency bands) of plural different frequency bands are aggregated by carrier aggregation and thereby dealt with as if those were one frequency (frequency band). Component carriers include uplink component carriers that correspond to the uplink and downlink component carriers that correspond to the downlink. Herein, frequency and frequency band may synonymously be used.

For example, in a case where 5 component carriers with a frequency band width of 20 MHz are aggregated by the carrier aggregation, the terminal device that is capable of the carrier aggregation performs transmission and reception while assuming the aggregated carriers as a frequency band width of 100 MHz. The component carriers to be aggregated may be contiguous frequencies or frequencies all or a portion of which are discrete frequencies. For example, in a case where available frequency bands are 800 MHz band, 2 GHz band, and 3.5 GHz band, one component carrier may be transmitted by 800 MHz band, another component carrier may be transmitted by 2 GHz band, and still another component carrier may be transmitted by 3.5 GHz band.

Further, plural contiguous or discrete component carriers in the same frequency band may be aggregated. The frequency band width of each of the component carriers may be a frequency band width (for example, 5 MHz or 10 MHz) narrower than a receivable frequency band width of the terminal device (for example, 20 MHz), and the frequency band widths to be aggregated may mutually be different. The frequency band width is preferably equivalent with any of frequency band widths of the cells in related art in consideration of backward compatibility. However, the frequency band width may be a frequency band width that is different from the frequency band of the cell in related art.

Further, component carriers (carrier types) that are not backward compatible may be aggregated. The number of uplink component carriers that are assigned (configured or added) to the terminal device by the base station device is preferably the same as or less than the number of downlink component carriers.

A cell that is configured with the uplink component carrier for performing an uplink control channel configuration for the radio resource request and the downlink component carrier that is linked with the uplink component carrier by cell-specific linkage is referred to as primary cell (PCell). Further, cells that are configured with the component carriers other than the primary cell are referred to as secondary cell (SCell). The terminal device performs reception of a paging message, detection of update of the broadcast information, an initial access procedure, a configuration of security information, and so forth by the primary cell but does not have to perform those by the secondary cell.

The primary cell is not an object of activation or deactivation control (that is, assumed to be necessarily activated). However, the secondary cell has an activated state and a deactivated state. A change of the states is explicitly indicated by the base station device, and the states are changed based on timers that are set for the terminal device for the respective component carriers. The primary cell and the secondary cells are in combination referred to as serving cells.

The carrier aggregation is communication by plural cells by using plural component carriers (frequency bands) and also referred to as cell aggregation. The terminal device may be connected with the base station device by radio connection via relay station devices (or repeaters) for the respective frequencies. That is, the base station device of this embodiment may be substituted by the relay station device.

The base station device manages the cells, which are the areas where the terminal device is capable of communication by the concerned base station device, with respect to each of the frequencies. The single base station device may manage plural cells. The cells are categorized into plural kinds in accordance with the size of the area where communication with the terminal device is feasible (cell size). For example, the cells are categorized into the macrocell and the small cell. Further, the small cells are categorized into femtocell, picocell, and nanocell in accordance with the area size. Further, when the terminal device is capable of communicating with a certain base station device, the cells that are configured to be used for communication with the terminal device among the cells of the base station device are the serving cells, and the other cells that are not used for communication are referred to as neighboring cell.

Figure 3:
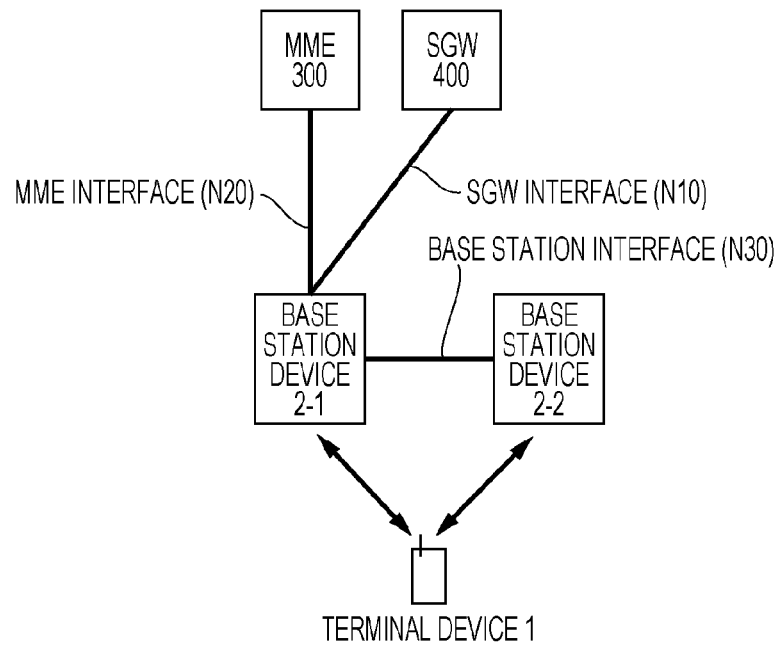
FIG. 3 is a diagram that illustrates a basic structure of dual connectivity according to the first embodiment.
Figure 4:
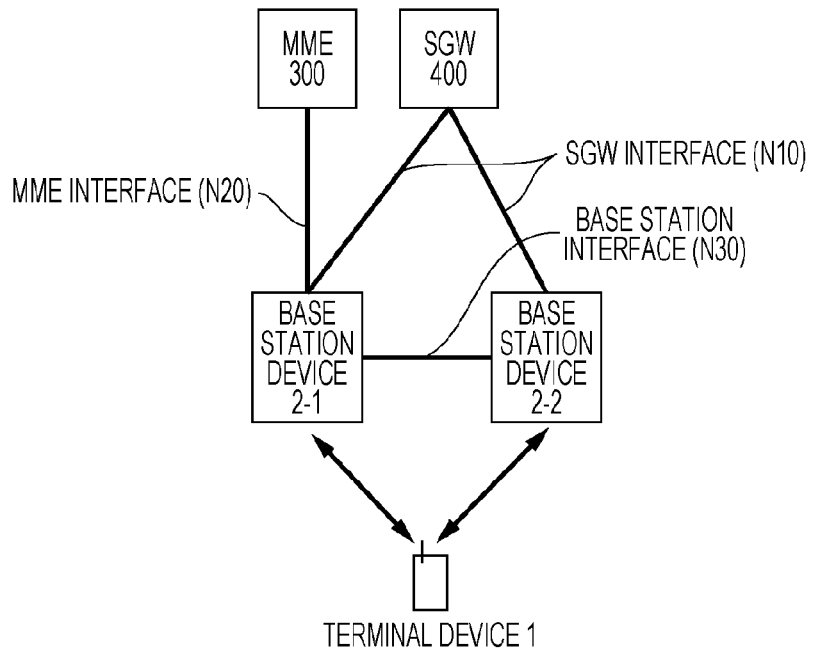
FIG. 4 is a diagram that illustrates a basic structure of the dual connectivity according to the first embodiment.

A basic structure (architecture) of the dual connectivity will be described with reference to FIGS. 3 and 4. FIGS. 3 and 4 illustrate that a terminal device 1 is simultaneously connected with plural base station devices 2 (FIGS. 3 and 4 illustrate a base station device 2-1 and a base station device 2-2). It is assumed that the base station device 2-1 is a base station device that configures the macrocell and the base station device 2-2 is a base station device that configures the small cell. Simultaneous connection of the terminal device 1 by using plural cells that belong to plural base station devices 2 as described above is referred to as dual connectivity. The cells that belong to the base station devices 2 may be operated at the same frequency or different frequencies.

The carrier aggregation is different from the dual connectivity in the point that the single base station device 2 manages the plural cells and the cells use different frequencies. In other words, the carrier aggregation is a technique in which the single terminal device 1 is connected with the single base station device 2 via plural cells with different frequencies. On the other hand, the dual connectivity is a technique in which the single terminal device 1 is connected with the plural base station devices 2 via plural cells with the same frequency or different frequencies.

The terminal device 1 and the base station device 2 may apply the technique applied to the carrier aggregation to the dual connectivity. For example, the terminal device 1 and the base station device 2 may apply the techniques such as assignment of the primary cell and secondary cell and activation and deactivation to the cells that are connected by the dual connectivity.

In FIGS. 3 and 4, the base station device 2-1 or the base station device 2-2 is connected with an MME 300 and an SGW 400 by backbone lines. The MME 300 is a higher control station device that corresponds to a mobility management entity (MME) and has roles such as mobility management and authentication control (security control) of the terminal device 1 and configuration of a path of user data for the base station device 2. The SGW 400 is a higher control station device that corresponds to a serving gateway (SGW) and has a role such as transmission of the user data in accordance with the path of the user data to the terminal device 1, the path being configured by the MME 300.

Further, in FIGS. 3 and 4, the connection path between the base station device 2-1 or the base station device 2-2 and the SGW 400 is referred to as an SGW interface N10. Further, the connection path between the base station device 2-1 or the base station device 2-2 and the MME 300 is referred to as an MME interface N20. Further, the connection path between the base station device 2-1 and the base station device 2-2 is referred to as a base station interface N30. The SGW interface N10 is also referred to as S1-U interface in EUTRA. Further, the MME interface N20 is also referred to as S1-MME interface in EUTRA. Further, the base station interface N30 is also referred to as X2 interface in EUTRA.

A configuration in FIG. 3 may be employed as an architecture that realizes the dual connectivity. In FIG. 3, the base station device 2-1 and the MME 300 are connected together by the MME interface N20. Further, the base station device 2-1 and the SGW 400 are connected together by the SGW interface N10. Further, the base station device 2-1 provides communication paths to the MME 300 and/or the SGW 400 for the base station device 2-2 via the base station interface N30. In other words, the base station device 2-2 is connected with the MME 300 and/or the SGW 400 via the base station device 2-1.

A configuration in FIG. 4 may be employed as another architecture that realizes the dual connectivity. In FIG. 4, the base station device 2-1 and the MME 300 are connected together by the MME interface N20. Further, the base station device 2-1 and the SGW 400 are connected together by the SGW interface N10. The base station device 2-1 provides the communication path to the MME 300 for the base station device 2-2 via the base station interface N30. In other words, the base station device 2-2 is connected with the MME 300 via the base station device 2-1. Further, the base station device 2-2 is connected with the SGW 400 via the SGW interface N10.

A configuration is possible in which the base station device 2-2 and the MME 300 are directly connected together by the MME interface N20.

Figure 5:
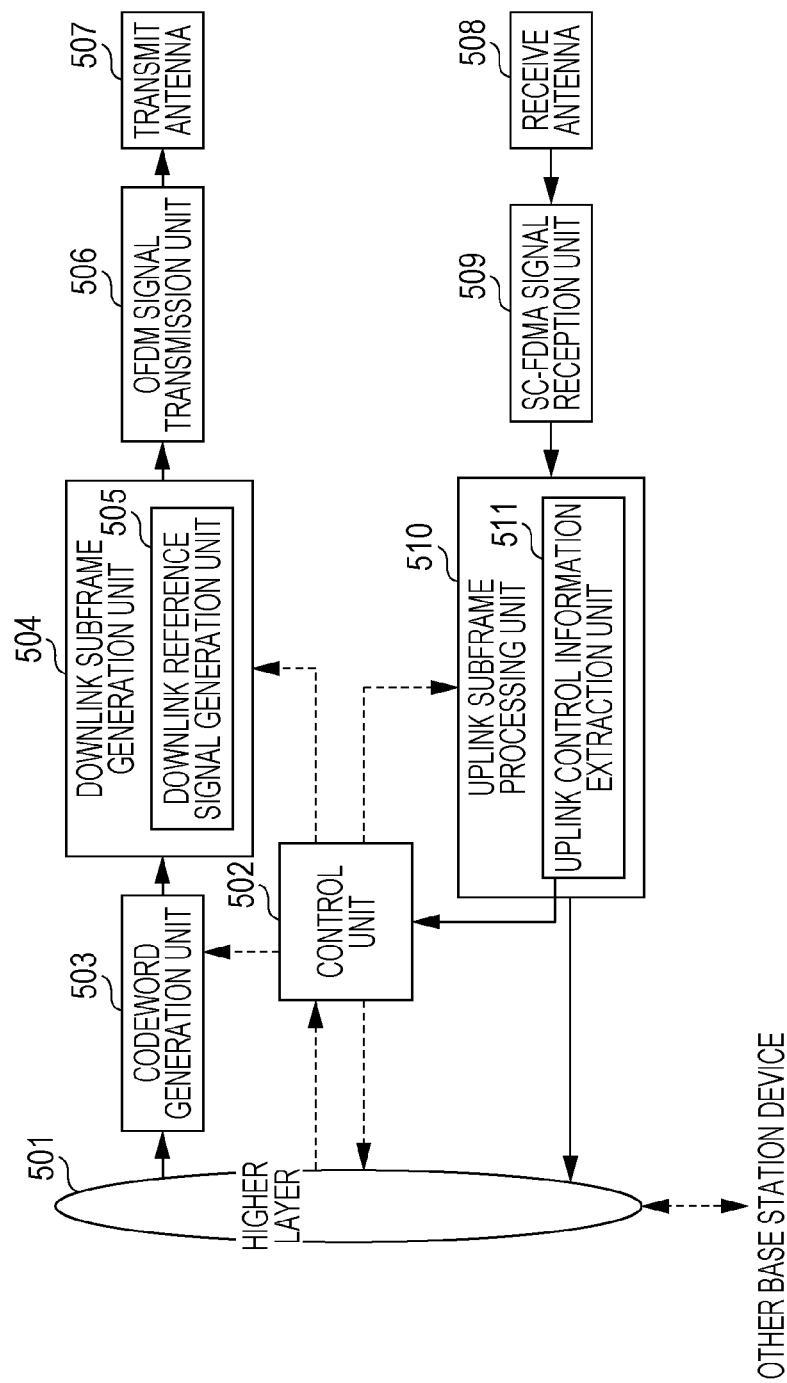
FIG. 5 is a diagram that illustrates one example of a block configuration of a base station device according to the first embodiment.

FIG. 5 is a schematic diagram that illustrates one example of a block configuration of the base station device 2-1 and the base station device 2-2 according to this embodiment. The base station device 2-1 and the base station device 2-2 have a higher layer (higher layer control information notification unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 has a downlink reference signal generation unit 505. Further, the uplink subframe processing unit 510 has an uplink control information extraction unit (CSI acquisition unit) 511.

Figure 6:
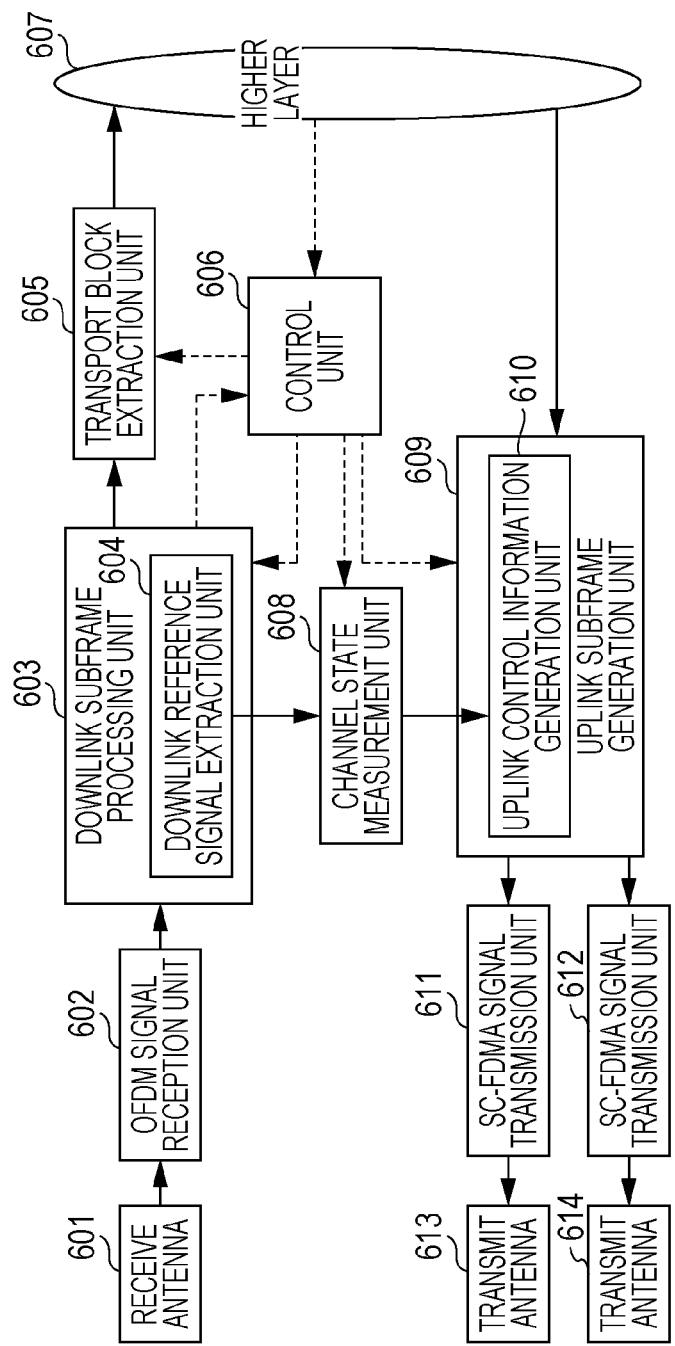
FIG. 6 is a diagram that illustrates one example of a block configuration of a terminal device according to the first embodiment.

FIG. 6 is a schematic diagram that illustrates one example of a block configuration of the terminal device 1 according to this embodiment. The terminal device 1 has a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher layer control information acquisition unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 has a downlink reference signal extraction unit 604. Further, the uplink subframe generation unit 609 has an uplink control information generation unit (UCI generation unit) 610.

First, a flow of transmission and reception of the downlink data will be described with reference to FIGS. 5 and 6. In the base station device 2-1 or the base station device 2-2, the control unit 502 retains a modulation and coding scheme (MCS) that indicates the modulation scheme, the coding rate, and so forth in the downlink, downlink resource assignment that indicates the RB used for data transmission, and information used for controlling a HARQ (redundancy version, HARQ process number, and new data index) and, based on those, controls the codeword generation unit 503 and the downlink subframe generation unit 504. The downlink data (also referred to as downlink transport block) transmitted from the higher layer 501 undergo processes such as error correction coding and a rate matching process in the codeword generation unit 503 and under control by the control unit 502, and codewords are thereby generated. A maximum of two codewords are simultaneously transmitted in one subframe in one cell. The downlink subframe generation unit 504 generates the downlink subframe in accordance with an instruction of the control unit 502. First, the codeword generated in the codeword generation unit 503 is converted into a modulation symbol sequence by a modulation process such as phase shift keying (PSK) modulation or quadrature amplitude modulation (QAM). Further, the modulation symbol sequence is mapped on the REs in a portion of the RBs, and the downlink subframe for respective antenna ports are generated by a precoding process. Here, a transmission data sequence transmitted from the higher layer 501 contains the higher layer control information, which is control information in the higher layer (for example, dedicated (individual) radio resource control (RRC) signaling). Further, the downlink reference signal generation unit 505 generates the downlink reference signal. The downlink subframe generation unit 504 maps the downlink reference signal on the RE in the downlink subframe in accordance with an instruction of the control unit 502. The downlink subframe generated by the downlink subframe generation unit 504 is modulated into OFDM signals in the OFDM signal transmission unit 506 and transmitted via the transmit antenna 507. Here, the configuration is exemplified in which one OFDM signal transmission unit 506 and one transmit antenna 507 are provided. However, in a case where the downlink subframe is transmitted by using plural antenna ports, a configuration is possible in which plural OFDM signal transmission units 506 and transmit antennas 507 are provided. Further, the downlink subframe generation unit 504 may have ability to generate the downlink control channels in the physical layer such as the PDCCH and EPDCCH and to map those on the REs in the downlink subframe. Each of the plural base station devices (the base station device 2-1 and the base station device 2-2) transmits an individual downlink subframe.

The terminal device 1 receives the OFDM signals by the OFDM signal reception unit 602 via the receive antenna 601 and conducts an OFDM demodulation process. The downlink subframe processing unit 603 first detects the downlink control channels in the physical layer such as the PDCCH or EPDCCH. More specifically, the downlink subframe processing unit 603 performs decoding while assuming that the PDCCH or EPDCCH is transmitted in the region to which the PDCCH or EPDCCH may be allocated and checks cyclic redundancy check (CRS) bits that are in advance added (blind decoding). That is, the downlink subframe processing unit 603 monitors the PDCCH and EPDCCH. In a case where the CRC bits match with an ID that is in advance assigned from the base station device (a terminal-specific identifier that is alone assigned to one terminal such as a cell-radio network temporary identifier (C-RNTI) or a semi persistent scheduling-C-RNTI (SPS-C-RNTI) or a temporary C-RNTI), the downlink subframe processing unit 603 recognizes that the PDCCH or EPDCCH is detected and extracts the PDSCH by using the control information contained in the detected PDCCH or EPDCCH. The control unit 606 retains the MCS that indicates the modulation scheme, the coding rate, and so forth in the downlink based on the control information, the downlink resource assignment that indicates the RB used for downlink data transmission, and the information used for controlling the HARQ and, based on those, controls the downlink subframe processing unit 603, the transport block extraction unit 605, and so forth. More specifically, the control unit 606 performs control such that an RE demapping process, a demodulation process, and so forth that correspond to an RE mapping process and the modulation process in the downlink subframe generation unit 504 are performed. The PDSCH extracted from the received downlink subframe is transmitted to the transport block extraction unit 605. Further, the downlink reference signal extraction unit 604 in the downlink subframe processing unit 603 extracts the downlink reference signal from the downlink subframe. The transport block extraction unit 605 conducts the rate matching process, error correction decoding, and so forth that correspond to the rate matching process and the error correction coding in the codeword generation unit 503, extracts the transport block, and transmits the transport block to the higher layer 607. The transport block contains the higher layer control information, and the higher layer 607 notifies the control unit 606 of a necessary physical parameter based on the higher layer control information. Each of the plural base station devices 2 (the base station device 2-1 and the base station device 2-2) transmits the individual downlink subframe. In order to receive this, the terminal device 1 may perform the above-described processes for the downlink subframe of each of the plural base station device 2. Here, the terminal device 1 may or may not recognize that the plural downlink subframes are transmitted from the plural base station devices 2. In the case of not recognizing that, the terminal device 1 may simply recognize that the plural downlink subframes are transmitted in plural cells.

Next, a flow of transmission and reception of the CSI with respect to downlink signals will be described. The terminal device 1 transmits the downlink reference signal extracted by the downlink reference signal extraction unit 604 to the channel state measurement unit 608, measures the channel state and/or interference in the channel state measurement unit 608, and further calculates the CSI based on the measured channel state and/or interference under instructions of the control unit 606. The terminal device 1 performs those processes for the downlink subframe of each of the plural cells. The uplink control information generation unit 610 generates the PUCCH that contains the calculated CSI. The uplink subframe generation unit 609 maps the PUSCH that contains uplink data transmitted from the higher layer 607 and the PUCCH generated in the uplink control information generation unit 610 on the RBs in the uplink subframe and thereby generates the uplink subframe. Here, the uplink subframe that contains the PUCCH and PUCCH is generated for each connectivity group. The connectivity group will be described in detail below. Here, it is assumed that there are two connectivity groups and those correspond to the base station device 2-1 and the base station device 2-2. The SC-FDMA signal transmission unit 611 conducts SC-FDMA modulation for the uplink subframe in one connectivity group (for example, the uplink subframe transmitted to the base station device 2-1), generates SC-FDMA signals thereof, and transmits the uplink subframe via the transmit antenna 613. The SC-FDMA signal transmission unit 612 conducts the SC-FDMA modulation for the uplink subframe in the other connectivity group (for example, the uplink subframe transmitted to the base station device 2-2), generates SC-FDMA signals thereof, and transmits the uplink subframe via the transmit antenna 614. Further, the uplink subframes in two or more connectivity groups may simultaneously be transmitted by using one subframe.

Each of the base station device 2-1 and the base station device 2-2 receives the uplink subframe in one connectivity group. Specifically, the SC-FDMA signal reception unit 509 receives the SC-FDMA signals via the receive antenna 508, and an SC-FDMA demodulation process is conducted. The uplink subframe processing unit 510 extracts the RB on which the PUCCH is mapped in accordance with an instruction of the control unit 502, and the uplink control information extraction unit 511 extracts the CSI contained in the PUCCH. The extracted CSI is transmitted to the control unit 502. The CSI is used for control of downlink transmission parameters (MCS, downlink resource assignment, HARQ, and so forth) by the control unit 502.

Figure 7:
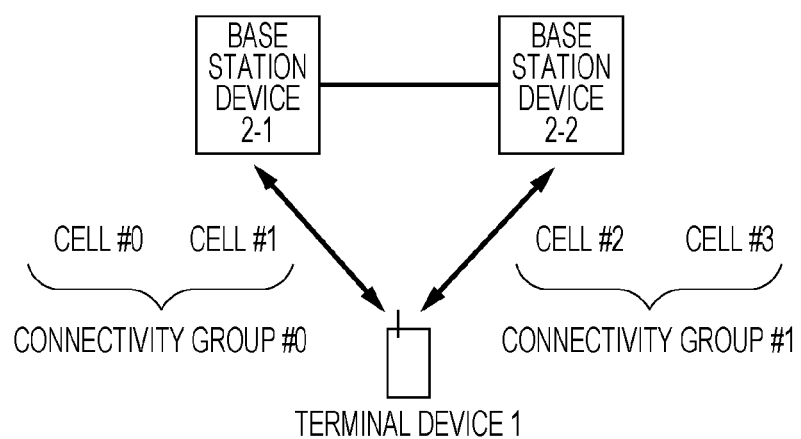
FIG. 7 is a diagram that illustrates one example of connectivity groups according to the first embodiment.

FIG. 7 illustrates one example of the connectivity group. The base station device 2-1, the base station device 2-2, and the terminal device 1 perform communication in plural serving cells (cell #0, cell #1, cell #2, and cell #3). The cell #0 is the primary cell, and the cell #1, cell #2, and cell #3, which are the other cells, are the secondary cells. The four cells are covered (provided) by the base station device 2-1 and the base station device 2-2, which are actually two different base station devices. The cell #0 and cell #1 are covered by the base station device 2-1, and the cell #2 and cell #3 are covered by the base station device 2-2. The serving cells are categorized into plural groups, and each of the groups is referred to as connectivity group. Here, the serving cells across low-speed backhaul may be categorized into a different group, and the serving cells that may use high-speed backhaul or the serving cells that do not have to use the backhaul because those are provided by the same device may be categorized into the same group. The serving cells of the connectivity group to which the primary cell belongs may be referred to as master cell, and the serving cells of the other connectivity groups may be referred to as assistant cell. Further, one serving cell in the connectivity group (for example, the serving cell whose cell index is smallest in the connectivity group) may be referred to as lead cell. The serving cells in the connectivity have component carriers with different carrier frequencies. Meanwhile, the serving cells in different connectivity groups may have component carriers with mutually different carrier frequencies or may have component carriers with the same carrier frequency (the same carrier frequency may be configured). For example, the carrier frequencies of the downlink component carrier and the uplink component carrier of the cell #1 are different from those of the cell #0. Meanwhile, the carrier frequencies of the downlink component carrier and the uplink component carrier that the cell #2 includes may be different from or the same as those of the cell #0. Further, the SR is preferably transmitted for each of the connectivity groups.

The terminal device 1 and the base station device 2 may use any of the following methods (1) to (5), for example, as a method of grouping the serving cells. The connectivity group may be configured by a method other than (1) to (5).

(1) The connectivity identifier values are configured for the serving cells, and the serving cells for which the same connectivity identifier value is configured are assumed as a group. The connectivity identifier value of the primary cell may not be configured or may be assumed to be a prescribed value (for example, zero).

(2) The connectivity identifier values are configured for the secondary cells, and the secondary cells for which the same connectivity identifier value is configured are assumed as a group. Further, the secondary cells for which the connectivity identifier values are not configured are assumed to be in the same group as the primary cell.

(3) SCell timing advanced group (STAG) identifier values are configured for the secondary cells, and the secondary cells for which the same STAG identifier value is configured are assumed as a group. Further, the secondary cells for which STAG identifiers are not configured are assumed to be in the same group as the primary cell. This group is also used as a group for performing timing adjustment of uplink transmission with respect to downlink reception.

(4) Any one of values of one to seven is configured as a secondary cell index (serving cell index) for each of the secondary cells. It is assumed that the serving cell index of the primary cell is zero. Grouping is performed based on those serving cell indices. For example, in a case where the secondary cell indices are one to four, the secondary cells may be assumed to be in the same group as the primary cell. Meanwhile, in a case where the secondary cell indices are five to seven, the secondary cells may be assumed to be in a different group from the primary cell.

(5) Any one of values of one to seven is configured as the secondary cell index (serving cell index) for each of the secondary cells. It is assumed that the serving cell index of the primary cell is zero. Further, the serving cell indices of the cells that belong to the groups are notified from the base station device 2. Here, the connectivity identifiers, the STAG identifiers, and the secondary cell indices may be configured for the terminal device 1 by the base station device 2-1 or the base station device 2-2 by using dedicated RRC signaling.

Figure 8:
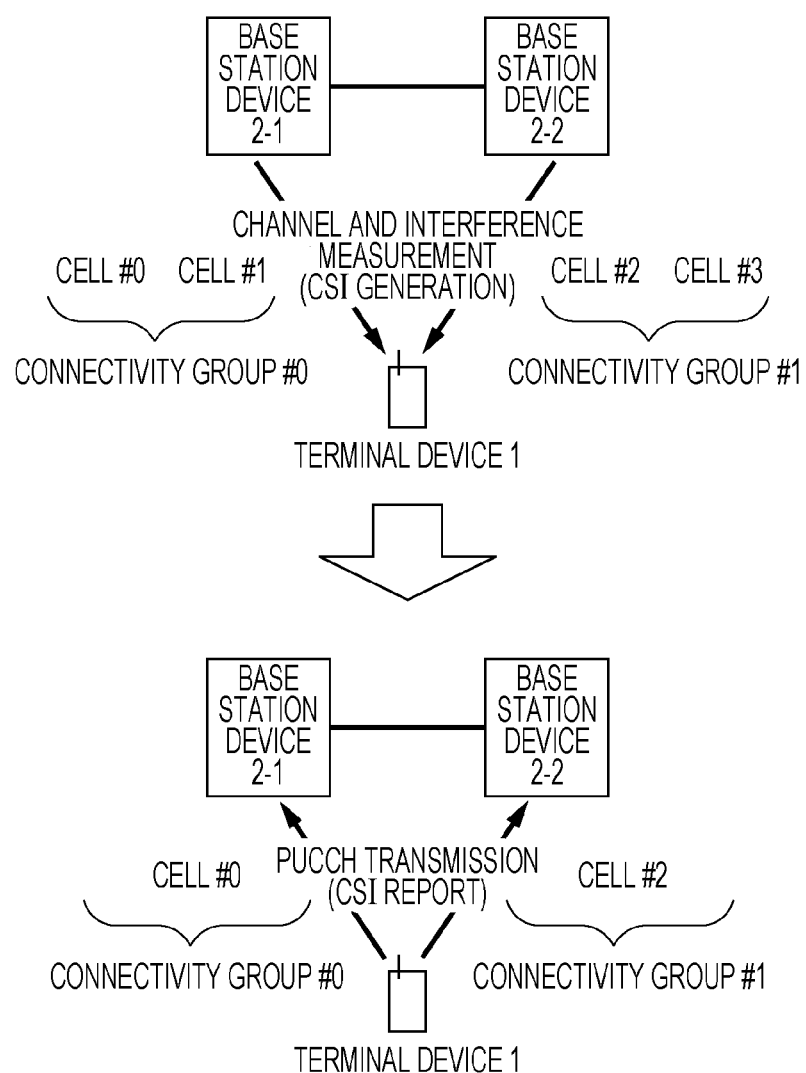
FIG. 8 is a diagram that illustrates one example of generation and report of CSI in the connectivity groups according to the first embodiment.

FIG. 8 illustrates one example of generation and report of the CSI in the connectivity groups of the terminal device 1. The base station device 2-1 and/or the base station device 2-2 configure parameters of the downlink reference signals in the serving cells for the terminal device 1 and transmit the downlink reference signals in the serving cells provided by the respective base station devices 2-1 and 2-2. The terminal device 1 receives the downlink reference signals in the serving cells and performs channel measurement and/or interference measurement. The downlink reference signal described here may include the CRS, a non-zero-power CSI-RS, and a zero-power CSI-RS. The terminal device 1 preferably performs the channel measurement by using the non-zero-power CSI-RS and performs the interference measurement by using the zero-power CSI-RS. In addition, based on channel measurement results and interference measurement results, the terminal device 1 calculates the RI that indicates a preferable rank, the PMI that indicates a preferable precoding matrix, and the CQI as the largest index that corresponds to the modulation scheme and the coding rate which satisfy desired quality (for example, where the transport block error rate does not exceed 0.1) with respect to a reference resource.

Next, the terminal device 1 reports the CSI. Here, the CSI of the serving cells that belong to the connectivity group is reported by using an uplink resource (PUCCH resource or PUSCH resource) in the cell of the concerned connectivity group. Specifically, in a certain subframe, the CSI of the cell #0 and the CSI of the cell #1 are transmitted by using the PUCCH of the cell #0, which is the lead cell and also the primary cell of connectivity group #0. Further, in a certain subframe, the CSI of the cell #0 and the CSI of the cell #1 are transmitted by using the PUSCH of any one of the cells that belong to the connectivity group #0. Further, in a certain subframe, the CSI of the cell #2 and the CSI of the cell #3 are transmitted by using the PUCCH of the cell #2, which is the lead cell of connectivity group #1. Further, in a certain subframe, the CSI of the cell #2 and the CSI of the cell #3 are transmitted by using the PUSCH of any one of the cells that belong to the connectivity group #1. That is, each of the lead cells may provide a portion of the functions of the primary cell (for example, transmission of the CSI by using the PUCCH) in the carrier aggregation in related art. The CSI reports about the serving cells of the connectivity groups exhibit similar behavior to the CSI reports about the serving cells in the carrier aggregation.

A PUCCH resource for periodic CSI of the serving cells that belong to a certain connectivity group is configured for the lead cell of the same connectivity group. The base station device 1 transmits information for configuring the PUCCH resource for the periodic CSI in the lead cell to the terminal device 1. In a case where the terminal device 1 receives the information for configuring the PUCCH resource for the periodic CSI in the lead cell, the terminal device 1 performs a report of the periodic CSI by using the PUCCH resource. The base station device 1 does not transmit information for configuring the PUCCH resource for the periodic CSI in the cell other than the lead cell to the terminal device 1. In a case where the terminal device 1 receives the information for configuring the PUCCH resource for the periodic CSI in the cell other than the lead cell, the terminal device 1 performs error handling and does not perform the report of the periodic CSI by using the PUCCH resource.

Figure 9:
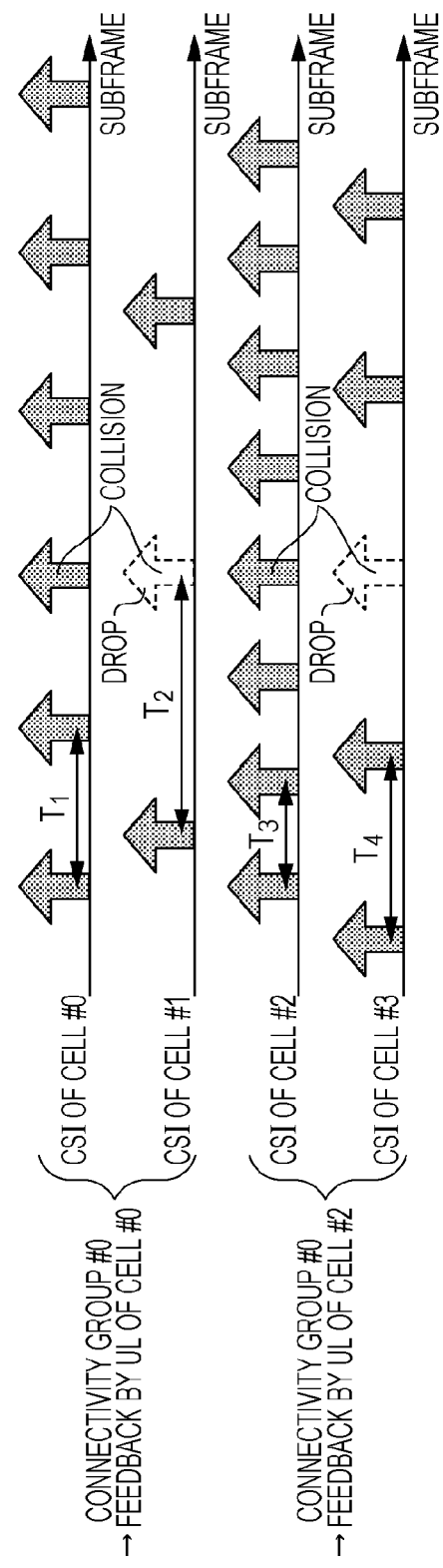
FIG. 9 is a diagram that illustrates one example of periodic CSI reports according to the first embodiment.

FIG. 9 illustrates one example of periodic CSI reports. The periodic CSI is periodically fed back from the terminal device 1 to the base station device 2 in the subframe in the period that is configured by the dedicated RRC signaling. Further, the periodic CSI is usually transmitted by using the PUCCH. Parameters (the period of the subframe, the offset between a reference subframe and a starting subframe, and a report mode) of the periodic CSI may individually be configured for each of the serving cells. An index of the PUCCH resource for the periodic CSI may be configured for each of the connectivity groups. Here, it is assumed that the periods of the cells #0, #1, #2, and #3 are configured as $T_1$, $T_2$, $T_3$, and $T_4$, respectively. The terminal device 1 performs uplink transmission of the periodic CSI of the cell #0 by the subframe of a $T_1$ period and performs uplink transmission of the periodic CSI of the cell #1 by the subframe of a $T_2$ period, by using the PUCCH resource of the cell #0, which is the lead cell and also the primary cell of the connectivity group #0. The terminal device 1 performs uplink transmission of the periodic CSI of the cell #2 by the subframe of a $T_3$ period and performs uplink transmission of the periodic CSI of the cell #3 by the subframe of a $T_4$ period, by using the PUCCH resource of the cell #2, which is the lead cell of the connectivity group #1. In a case where the periodic CSI reports collide with each other between plural servings in one connectivity group (a case where plural periodic CSI reports occur in one subframe), only one periodic CSI report is transmitted, and the other periodic CSI report is dropped (not transmitted).

As a method of deciding which periodic CSI report is transmitted and which periodic CSI report is dropped in a case where a collision occurs, the terminal device 1 may use methods that will next be described. That is, in each of the connectivity groups, the periodic CSI report is dropped in accordance with the following (A1) to (A12). Preferably, determinations are performed in ascending order from (A1), and processes that match with conditions are sequentially performed.

(A1) In a case of the collision the periodic CSI report with PUCCH report type 3, 5, or 6 of one serving cell with the periodic CSI report with PUCCH report type 1, 1a, 2, 2a, 2b, 2c, or 4 of the same serving cell, the latter periodic CSI report (the PUCCH report type 1, 1a, 2, 2a, 2b, 2c, or 4) has low priority and is dropped.

(A2) For a serving cell and a terminal configured in a transmission mode 10, in a case of the collision between the periodic CSI reports of the same serving cell with the PUCCH report types of the same priority, and the periodic CSI reports corresponding to different CSI processes, the periodic CSI reports corresponding to all the CSI processes except the CSI process with the lowest CSI process index are dropped.

(A3) If the terminal device 1 is configured with more than one serving cell, the terminal device 1 transmits the periodic CSI report of only one serving cell in any given subframe. For a given subframe, in a case of the collision of the periodic CSI report with the PUCCH report type 3, 5, 6, or 2a of one serving cell with the periodic CSI report with the PUCCH report type 1, 1a, 2, 2b, 2c, or 4 of another serving cell, the latter periodic CSI report (the PUCCH report type 1, 1a, 2, 2b, 2c, or 4) has low priority and is dropped. In a given subframe, in a case of the collision of the periodic CSI report with the PUCCH report type 2, 2b, 2c, or 4 of one serving cell with the periodic CSI report with the PUCCH report type 1 or 1a of another serving cell, the latter periodic CSI report with the PUCCH report type 1 or 1 a has low priority and is dropped.

(A4) For a given subframe and serving cells with the terminal device 1 configured in transmission modes 1 to 9, in a case of the collision between the periodic CSI reports of those different serving cells with the PUCCH report types of the same priority, the periodic CSI reports for all the serving cells except the serving cell with the lowest serving cell index are dropped.

(A5) For a given subframe and serving cells with the terminal device 1 configured in transmission mode 10, in a case of the collision between the periodic CSI reports of the different serving cells with the PUCCH report types of the same priority and the periodic CSI reports corresponding to the CSI processes with the same CSI process index, the periodic CSI reports for all the serving cells except the serving cell with the lowest serving cell index are dropped.

(A6) For a given subframe and serving cells with the terminal device 1 configured in transmission mode 10, in a case of the collision between the periodic CSI reports of the different serving cells with the PUCCH report types of the same priority and the periodic CSI reports corresponding to the CSI processes with different CSI process identifiers, the periodic CSI reports for all the serving cells except the periodic CSI report corresponding to the CSI process with the lowest CSI process index are dropped.

(A7) For a given subframe, in a case of the collision between the periodic CSI report of a given serving cell with the terminal device 1 configured in transmission modes 1 to 9, and the periodic CSI report(s) that corresponding to the CSI process(es) of a different serving cell with the terminal device 1 configured in transmission mode 10, and the periodic CSI reports of the serving cells with the PUCCH report types of the same priority, the periodic CSI report(s) corresponding to the CSI process(es) with CSI process index greater than one of the different serving cell are dropped.

(A8) For a given subframe, in a case of the collision between the periodic CSI report of a given serving cell with the terminal device 1 configured in transmission modes 1 to 9, and the periodic CSI report corresponding to the CSI process with the CSI process equal to one of a different serving cell with the terminal device 1 configured in transmission mode 10, and the periodic CSI reports of the serving cells with the PUCCH report types of the same priority, the CSI report of the serving cell with the highest serving cell index is dropped.

(A9) In a case of the collision between the periodic CSI and HARQ-ACK, the periodic CSI is dropped based on a prescribed rule that is separately defined.

(A10) The periodic CSI report of a certain PUCCH report type has to be transmitted by a PUCCH format 2, 2a, or 2b.

(A11) If the terminal device 1 is not configured for simultaneous the PUSCH and PUCCH transmission or, if the terminal device 1 is configured for simultaneous the PUSCH and PUCCH transmission and not transmitting the PUSCH, in a case of collision between the periodic CSI and a positive SR in the same subframe, the CSI is dropped. However, in a case where the terminal device 1 is configured to simultaneously transmit the HARQ-ACK and the periodic CSI by using a PUCCH format 3 and the HARQ-ACK, the periodic CSI, and a positive or negative SR collide with each other in the same subframe, the HARQ-ACK, the periodic CSI, and the positive or negative SR are simultaneously transmitted by the PUCCH format 3, and the CSI is not dropped.

(A12) In a case of the collision between the periodic CSI and aperiodic CSI, the periodic CSI is dropped.

Here, the PUCCH report types 1, 1a, 2, 2a, 2b, 2c, 3, 4, 5, and 6 are used for feedback of the sub-band CQI in the sub-band selected by the terminal device 1, the sub-band CQI and the second PMI, the wideband CQI and PMI, the wideband PMI, the wideband CQI and PMI, the wideband CQI and PMI, the RI, the wideband CQI, the RI and the wideband PMI, and the RI and the PTI, respectively. Further, the transmission modes 1 to 10 are downlink transmission modes and correspond to single antenna port transmission, transmission diversity transmission, high-delay cyclic delay diversity (CCD) transmission, closed-loop spatial multiplexing transmission, multi-user multiple input multiple output (MU-MIMO) transmission, single layer closed-loop spatial multiplexing transmission, the single antenna port transmission, up to 2-layer transmission, up to S-layer transmission, and the up to 8-layer transmission (the up to 8-layer transmission and/or coordinated multipoint transmission), respectively. Further, one CSI process may be configured for one serving cell for which the transmission modes 1 to 9 are configured, one or more CSI processes may be configured for one serving cell for which the transmission mode 10 is configured, and the periodic CSI report is performed for each of the CSI processes. Here, the CSI processes correspond to transmission points for coordinated multiple point (CoMP) transmission, and different CSI process identifiers are assigned to the CSI processes. Further, the PUCCH format 2, 2a, or 2b is a format of the PUCCH for feeding back the periodic CSI. Further, the PUCCH format 3 is a format of the PUCCH for feeding back the HARQ-ACK.

As another method of deciding which periodic CSI report is transmitted and which periodic CSI report is dropped in a case where a collision occurs, the terminal device 1 may use the following methods (B1) to (B12). Preferably, determinations are performed in ascending order from (B1), and processes that match with conditions are sequentially performed.

(B1) In a case of the collision between the periodic CSI report of the PUCCH report type 3, 5, or 6 of one serving cell and the periodic CSI report of the PUCCH report type 1, 1a, 2, 2a, 2b, 2c, or 4 of the same serving cell, the latter periodic CSI report (the PUCCH report type 1, 1a, 2, 2a, 2b, 2c, or 4) has low priority and is dropped.

(B2) In a case where the collision occurs between the periodic CSI reports of the PUCCH report types with the same priority and of the same serving cell in the terminal device 1 for which one serving cell and the transmission mode 10 are configured and those periodic CSI reports correspond to different CSI processes, the periodic CSI reports for all the CSI processes other than the CSI process with the smallest CSI process index are dropped.

(B3) In a case where more than one serving cell is configured for the terminal device 1, the terminal device 1 transmits the periodic CSI report of only one serving cell of each of the connectivity groups in an arbitrary subframe. In a certain subframe, in a case of the collision between the periodic CSI report of the PUCCH report type 3, 5, 6, or 2a of one serving cell of a certain connectivity group and the periodic CSI report of the PUCCH report type 1, 1a, 2, 2b, 2c, or 4 of the other serving cell of the same connectivity group, the latter periodic CSI report (the PUCCH report type 1, 1a, 2, 2b, 2c, or 4) has low priority and is dropped. In a certain subframe, in a case of the collision between the periodic CSI report of the PUCCH report type 2, 2b, 2c, or 4 of one serving cell of a certain connectivity group and the periodic CSI report of the PUCCH report type 1 or 1a of the other serving cell of the same connectivity group, the latter periodic CSI report of the PUCCH report type 1 or 1a has low priority and is dropped.

(B4) In a certain subframe and plural serving cells in the same connectivity group in which the transmission modes 1 to 9 are configured for the terminal device 1, in a case of the collision between the periodic CSI reports of those different serving cells of the PUCCH report types with the same priority, the periodic CSI reports for all the serving cells in the connectivity group other than the serving cell with the smallest serving cell index in the connectivity group are dropped.

(B5) In a certain subframe and plural serving cells in which the transmission mode 10 is configured for the terminal device 1, in a case where the collision occurs between the periodic CSI reports of the different serving cells of the PUCCH report types with the same priority and of the same connectivity group and those periodic CSI reports correspond to the CSI processes with the same CSI process index, the periodic CSI reports for all the serving cells in the connectivity group other than the serving cell with the smallest serving cell index in the connectivity group are dropped.

(B6) In a certain subframe and plural serving cells in which the transmission mode 10 is configured for the terminal device 1, in a case where the collision occurs between the periodic CSI reports of the PUCCH report types with the same priority and of the different serving cells of the same connectivity group and those periodic CSI reports correspond to the CSI processes with different CSI process identifiers, the periodic CSI reports for all the serving cells in the connectivity group other than the periodic CSI report that corresponds to the CSI process with the smallest CSI process index in the connectivity group are dropped.

(B7) In a certain subframe, in a case where the collision occurs between the CSI report of a certain serving cell in which the transmission modes 1 to 9 are configured for the terminal device 1 and which belongs to a certain connectivity group and the periodic CSI report that corresponds to the CSI process of a different serving cell in which the transmission mode 10 is configured for the terminal device 1 and which belongs to the same connectivity group and where the periodic CSI reports of those serving cells are of the PUCCH report types with the same priority, the periodic CSI report that corresponds to the CSI process whose CSI process index in the different serving cell in the connectivity group is larger than one is dropped.

(B8) In a certain subframe, in a case where the collision occurs between the periodic CSI report of a certain serving cell in which the transmission modes 1 to 9 are configured for the terminal device 1 and which belongs to a certain connectivity group and the periodic CSI report that corresponds to the CSI process whose CSI process of a different serving cell in which the transmission mode 10 is configured for the terminal device 1 and which belongs to the same connectivity group is one and where the periodic CSI reports of those serving cells are of the PUCCH report types with the same priority, the periodic CSI reports of the serving cell with the largest serving cell index in the connectivity group is dropped.

(B9) In a case of the collision between the CSI and the HARQ-ACK, the CSI is dropped based on a prescribed rule that is separately defined.

(B10) The CSI report of a certain PUCCH report type has to be transmitted by the PUCCH format 2, 2a, or 2b.

(B11) If the terminal device 1 is not configured to simultaneously transmit the PUSCH and PUCCH or if the terminal device 1 is configured to simultaneously transmit the PUSCH and PUCCH and does not transmit the PUSCH, the CSI is dropped in a case where the CSI and the positive SR in the same connectivity group collide with each other in the same subframe. However, in a case where the terminal device 1 is configured to simultaneously transmit the HARQ-ACK and the periodic CSI by using the PUCCH format 3 in the connectivity group and the HARQ-ACK, the periodic CSI, and the positive or negative SR to the connectivity group collide with each other in the same subframe, the HARQ-ACK, the periodic CSI, and the positive or negative SR to the connectivity group are simultaneously transmitted by the PUCCH format 3 in the connectivity group, and the periodic CSI is not dropped.

(B12) In a case of the collision between the periodic CSI to a certain connectivity group and the aperiodic CSI to the same connectivity group, the periodic CSI to the connectivity group is dropped.

In a case where the periodic CSI collides with the HARQ-ACK as the above-described (A9) or (B9), the dropping is performed in accordance with a prescribed rule that is separately defined. Rules described in (C1) or (C2) may be used as the prescribed rule.

(C1) In a case where the periodic CSI report collides with the HARQ-ACK in the same subframe by which the PUSCH is not transmitted with respect to the terminal device 1 for which one serving cell is configured and the PUCCH format 3 is not configured, if a first parameter that is configured in the higher layer and is about simultaneous transmission of the HARQ-ACK and periodic CQI is set to true, the periodic CSI report is multiplexed with the HARQ-ACK in the PUCCH. If the first parameter is not set to true, the periodic CSI report is dropped.

(C2) In a case where the periodic CSI report collides with the HARQ-ACK in the same subframe by which the PUSCH is not transmitted with respect to the terminal device 1 for which more than one serving cell is configured, if the first parameter that is configured in the higher layer and is about simultaneous transmission of the HARQ-ACK and periodic CQI is set to true and the HARQ-ACK corresponds to PDSCH transmission only in the primary cell or the PDCCH or EPDCCH that indicates SPS release, the periodic CSI report is multiplexed with the HARQ-ACK in the PUCCH by using the PUCCH format 2, 2a, or 2b. Otherwise, if the PUCCH format 3 is configured for the terminal device 1, a second parameter that is configured in the higher layer and is about simultaneous transmission of the HARQ-ACK and the periodic CQI is set to true, the PUCCH resource is decided in a procedure related to the PUCCH format 3, and the number of the total bits in the subframe that corresponds to the HARQ-ACK, the SR, and the periodic CSI thereof is not larger than 22 in a usual case or a spatially bundled case, the periodic CSI report is multiplexed with the HARQ-ACK in the PUCCH by using the PUCCH format 3. Otherwise, the periodic CSI is dropped.

Further, as a method of deciding which uplink resource (PUCCH resource or PUSCH resource) is used to transmit the periodic CSI report and/or the HARQ-ACK, the terminal device 1 may use methods that will next be described. That is, in each of the connectivity groups, the terminal device 1 decides the uplink resource (PUCCH resource or PUSCH resource) for transmitting the periodic CSI report and/or the HARQ-ACK in accordance with any of the following (D1) to (D6).

(D1) In a case where more than one serving cell is configured for the terminal device 1, simultaneous transmission of the PUSCH and PUCCH is not configured, the uplink control information for a certain connectivity group contains only the periodic CSI in a subframe n, and the PUSCH is not transmitted in the connectivity group, the uplink control information is transmitted by the PUCCH of the lead cell in the connectivity group.

(D2) In a case where more than one serving cell is configured for the terminal device 1, simultaneous transmission of the PUSCH and PUCCH is not configured, the uplink control information for a certain connectivity group contains the periodic CSI and/or the HARQ-ACK in the subframe n, and the PUSCH is transmitted by the lead cell in the connectivity group, the uplink control information is transmitted by the PUSCH of the lead cell in the connectivity group.

(D3) In a case where more than one serving cell is configured for the terminal device 1, simultaneous transmission of the PUSCH and PUCCH is not configured, the uplink control information for a certain connectivity group contains the periodic CSI and/or the HARQ-ACK in the subframe n, the PUSCH is not transmitted by the lead cell in the connectivity group, and the PUSCH is transmitted by at least one secondary cell other than the lead cell in the connectivity group, the uplink control information is transmitted by the PUSCH of the secondary cell with the smallest cell index in the connectivity group.

(D4) In a case where more than one serving cell is configured for the terminal device 1, simultaneous transmission of the PUSCH and PUCCH is configured, and the uplink control information for a certain connectivity group contains only the periodic CSI in the subframe n, the uplink control information is transmitted by the PUCCH of the lead cell in the connectivity group.

(D5) In a case where more than one serving cell is configured for the terminal device 1, simultaneous transmission of the PUSCH and PUCCH is configured, the uplink control information for a certain connectivity group contains the periodic CSI and the HARQ-ACK in the subframe n, and the PUSCH is transmitted by the lead cell in the connectivity group, the HARQ-ACK is transmitted by the PUCCH of the lead cell in the connectivity group, and the periodic CSI is transmitted by the PUSCH of the lead cell in the connectivity group.

(D6) In a case where more than one serving cell is configured for the terminal device 1, simultaneous transmission of the PUSCH and PUCCH is configured, the uplink control information for a certain connectivity group contains the periodic CSI and the HARQ-ACK in the subframe n, the PUSCH is not transmitted by the lead cell in the connectivity group, and the PUSCH is transmitted by at least another secondary cell in the same connectivity group, the HARQ-ACK is transmitted by the PUCCH of the lead cell in the connectivity group, and the periodic CSI is transmitted by the PUSCH of the secondary cell with the smallest secondary cell index in the connectivity group.

As described above, in a communication system that has the plural base station device 2, each of which communicates with the terminal device 1 by using one or more serving cells, the terminal device 1 configures the connectivity identifier for each of the serving cells in the higher layer control information acquisition unit and calculates the periodic channel state information of each of the serving cells in the channel state information generation unit. In one subframe, in a case where the reports of the periodic channel state information of the serving cells with the connectivity identifiers of the same value collide with each other, pieces of the period channel state information other than one piece thereof are dropped, and the uplink control information is generated in the uplink control information generation unit. The uplink subframe that contains the uplink control information is transmitted in the uplink control information transmission unit. At least one of the base station device 2-1 and the base station device 2-2 configures values that correspond to the plural base station devices as the connectivity identifiers of the serving cells (for example, a first value for the serving cells of the base station device 2-1, a second value for the serving cells of the base station device 2-2, or the like) in the higher layer control information notification unit. Further, each of the base station device 2-1 and the base station device 2-1 receives the uplink subframe in the uplink control information reception unit and extracts the uplink control information that contains only one piece of periodic channel state information among colliding pieces of periodic channel state information in the uplink control information extraction unit in a case where the reports of the periodic channel state information of two or more serving cells with the connectivity identifier value that corresponds to the first base station device collide with each other. The CSI of the serving cells in the connectivity groups is preferably transmitted and received by the uplink subframes of the respective lead cells of the connectivity groups.

Here, both of or only one of the base station device 2-1 and the base station device 2-2 may include the functions of the higher layer control information notification unit. Only one of the base station device 2-1 and the base station device 2-2 including the functions means that the higher layer control information is transmitted by either one of the base station device 2-1 and the base station device 2-2 in the dual connectivity but does not mean employment of the configuration that the base station device 2-1 or the base station device 2-2 does not have the higher layer control information notification unit itself. The base station device 2-1 and the base station device 2-2 have a backhaul transmission reception mechanism. In a case where the base station device 2-2 performs configuration related to the serving cells provided by the base station device 2-1 (which includes connectivity group configuration of those serving cells), the base station device 2-1 transmits the information that indicates the configuration to the base station device 2-2 via the backhaul, and the base station device 2-2 performs configuration (configuration in the base station device 2-2 or signaling to the terminal device 1) based on the information received via the backhaul. Conversely, in a case where the base station device 2-1 performs configuration related to the serving cells provided by the base station device 2-2, the base station device 2-2 transmits the information that indicates the configuration to the base station device 2-1 via the backhaul, and the base station device 2-1 performs configuration (configuration in the base station device 2-1 or signaling to the terminal device 1) based on the information received via the backhaul. Alternatively, a portion of the functions of the higher layer control information notification unit may be provided by the base station device 2-2, and the other functions may be provided by the base station device 2-1. In this case, the base station device 2-1 may be referred to as master base station device, and the base station device 2-2 may be referred to as assisting base station device. The assisting base station device may provide configuration related to the serving cells provided by the assisting base station device (which includes connectivity group configuration of those serving cells) to the terminal device 1. On the other hand, the master base station device may provide configuration related to the serving cells provided by the master base station device (which includes connectivity group configuration of those serving cells) to the terminal device 1.

The terminal device 1 may recognize that communication is performed only with the base station device 2-1. That is, the higher layer control information acquisition unit may acquire the higher layer control information that is notified from the base station device 2-1 and the base station device 2-2 while assuming that the higher layer control information is notified from the base station device 2-1. Alternatively, the terminal device 1 may recognize that communication is performed with two base station devices, which are the base station device 2-1 and the base station device 2-1. That is, the higher layer control information acquisition unit may acquire the higher layer control information that is notified from the base station device 2-1 and the higher layer control information that is notified from the base station device 2-2 and may combine (merge) those together.

Accordingly, each of the base station devices 2 may directly receive a desired periodic CSI report from the terminal device 1 not via the other base station device 2. Thus, even in a case where the base station devices 2 are mutually connected by the low-speed backhaul, scheduling may be performed by using a timely periodic CSI report.

Next, an aperiodic CSI report will be described. The aperiodic CSI report is indicated by using a CSI request field in the uplink grant transmitted by the PDCCH or EPDCCH and is transmitted by the PUSCH. More specifically, the base station device 2-1 or the base station device 2-2 first configures n kinds (n is a natural number) of serving cell combinations (or CSI process combinations) for the terminal device 1 by using the dedicated RRC signaling. The CSI request field may express n+2 kinds of states. The states represent not feeding back the aperiodic CSI report, feeding back the CSI report in the serving cell assigned by the uplink grant (or in the CSI process in the serving cell assigned by the uplink grant), and feeding back the CSI report in n kinds (n is a natural number) of combinations of the serving cells (or combinations of the CSI processes) that are in advance configured. The base station device 2-1 or the base station device 2-2 configures the value of the CSI request field based on a desired CSI report, and the terminal device 1 determines which CSI report is performed based on the value of the CSI request field and performs the CSI report. The base station device 2-1 or the base station device 2-2 receives a desired CSI report.

In one example of the aperiodic CSI report in the dual connectivity, n kinds (n is a natural number) of serving cell combinations (or CSI process combinations) are configured for each of the connectivity group. For example, the base station device 2-1 or the base station device 2-2 configures n kinds (n is a natural number) of combinations of the serving cells in the connectivity group #0 (or combinations of the CSI processes in the connectivity group #0) and n kinds (n is a natural number) of combinations of the serving cells in the connectivity group #1 (or combinations of the CSI processes in the connectivity group #0) for the terminal device 1. The base station device 2-1 or the base station device 2-2 configures the value of the CSI request field based on a desired CSI report. The terminal device 1 determines to which connectivity group the serving cell, to which the PUSCH resource is assigned by the uplink grant for requesting the aperiodic CSI report, belongs, determines which CSI report is performed by using n kinds (n is a natural number) of serving cell combinations (or CSI process combinations) that correspond to the connectivity group to which the serving cell, to which the PUSCH resource is assigned by the uplink grant for requesting the aperiodic CSI report, belongs, and performs the aperiodic CSI report by the PUSCH assigned by the uplink grant for requesting the aperiodic CSI report. The base station device 2-1 or the base station device 2-2 receives a desired CSI report.

In another example of the aperiodic CSI report in the dual connectivity, one set of n kinds (n is a natural number) of serving cell combinations (or CSI process combinations) is configured. Each set of n kinds (n is a natural number) of serving cell combinations (or CSI process combinations) is limited to the combination of the serving cells that belong to any connectivity group (or the CSI processes of the serving cells that belong to the connectivity group). The base station device 2-1 or the base station device 2-2 configures the value of the CSI request field based on a desired aperiodic CSI report, and the terminal device 1 determines which aperiodic CSI report is performed based on the value of the CSI request field and performs the aperiodic CSI report. The base station device 2-1 or the base station device 2-2 receives a desired aperiodic CSI report.

Accordingly, each of the base station devices 2 may directly receive a desired aperiodic CSI report from the terminal device 1 not via the other base station device 2. Further, each PUSCH contains only the aperiodic CSI report of the serving cell that belongs to one connectivity group (or the CSI process of the serving cell that belongs to the connectivity group), and the aperiodic CSI report that is independent from the configuration of the other base station device 2 may thus be received from the terminal device 1. Thus, even in a case where the base station devices 2 are mutually connected by the low-speed backhaul, scheduling may be performed by using a timely aperiodic CSI report.

Second Embodiment

A second embodiment of the present invention will hereinafter be described. In the description made below, only components that are different from the first embodiment will be focused on and described. That is, as for other than those, the techniques described in the first embodiment may be used.

Figure 10:
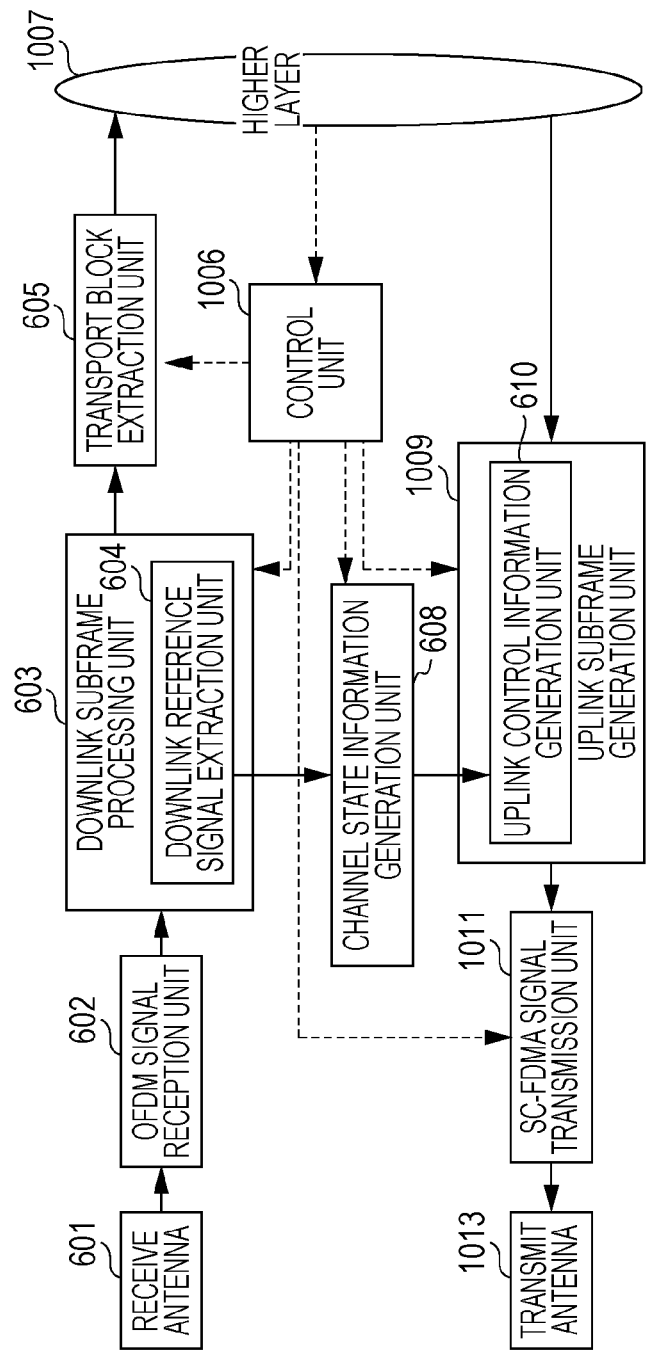
FIG. 10 is a diagram that illustrates one example of the block configuration of a terminal device according to a second embodiment.

FIG. 10 is a schematic diagram that illustrates one example of the block configuration of the terminal device 1 according to this embodiment. The terminal device 1 has the receive antenna (terminal receive antenna) 601, the OFDM signal reception unit (downlink reception unit) 602, the downlink subframe processing unit 603, the transport block extraction unit (data extraction unit) 605, a control unit (terminal control unit) 1006, a higher layer (higher layer control information acquisition unit) 1007, the channel state measurement unit (CSI generation unit) 608, an uplink subframe generation unit 1009, an SC-FDMA signal transmission unit (UCI transmission unit) 1011, and a transmit antenna (terminal transmit antenna) 1013. The downlink subframe processing unit 603 has the downlink reference signal extraction unit 604. Further, the uplink subframe generation unit 1009 has the uplink control information generation unit (UCI generation unit) 610. The blocks provided with the same reference numerals as the blocks in FIG. 6 are configured to have the same functions as the blocks in FIG. 6.

The terminal device 1 in this embodiment may transmit the PUCCH or PUSCH to only one connectivity group in one subframe. The base station device 2-1 or the base station device 2-2 configures which uplink subframes are the subframes for which connectivity groups, that is, configures the set of uplink subframes for each of the connectivity groups for the terminal device 1 by using the dedicated RRC signaling or common RRC signaling. The higher layer 1007 transmits parameters based on the configuration to the control unit 1006. The control unit 1006 instructs the uplink subframe generation unit 1009 that the uplink subframe for which connectivity group is generated. Further, the control unit 1006 instructs the SC-FDMA signal transmission unit 1011 that transmission is performed by the uplink component carrier in the serving cell for which connectivity group. The uplink subframe generation unit 1009 generates the uplink subframe for any of the connectivity groups under the instructions of the control unit 1006. The SC-FDMA signal transmission unit 1011 transmits SC-FDMA signals at the carrier frequency for the uplink component carrier in the serving cell of any of the connectivity groups under the instructions of the control unit 1006. The transmit antenna 1013 may transmit signals at the carrier frequency for the uplink component carrier in the serving cell of any of the connectivity groups.

Figure 11:
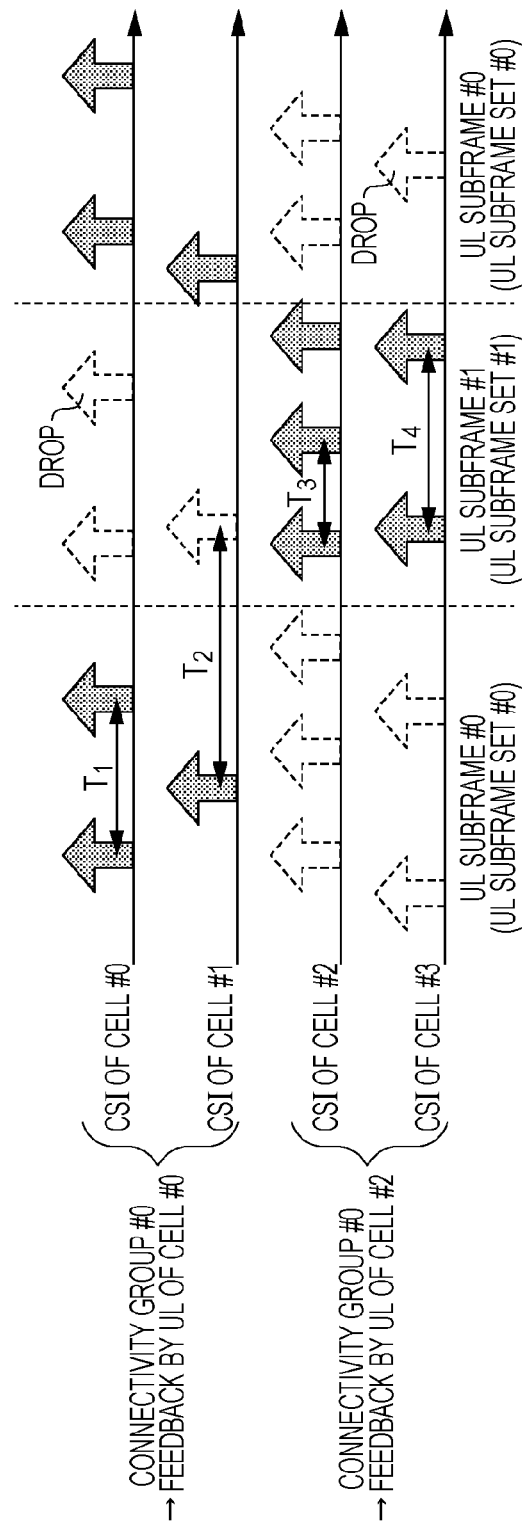
FIG. 11 is a diagram that illustrates one example of periodic CSI reports according to the second embodiment.

FIG. 11 illustrates one example of the periodic CSI reports. The parameters (the period of the subframe, the offset between a reference subframe and a starting subframe, and the report mode) of the periodic CSI may individually be configured for each of the serving cells. The index of the PUCCH resource for the periodic CSI may be configured for each of the connectivity groups. Here, it is assumed that the periods of the cells #0, #1, #2, and #3 are configured as $T_1$, $T_2$, $T_3$, and $T_4$, respectively. In the cell #0 that is the lead cell and also the primary cell of the connectivity group #0, uplink transmission of the periodic CSI of the cell #0 is performed by the subframe of the $T_1$ period, and uplink transmission of the periodic CSI of the cell #1 is performed by the subframe of the $T_2$ period. In the cell #2 that is the lead cell of the connectivity group #1, uplink transmission of the periodic CSI of the cell #2 is performed by the subframe of the $T_3$ period, and uplink transmission of the periodic CSI of the cell #3 is performed by the subframe of the $T_4$ period. In an arbitrary subframe, only the periodic CSI report in the serving in one connectivity group (or in the CSI process of the serving cell in one connectivity group) is transmitted, and the periodic CSI report of the other connectivity group is dropped (not transmitted).

As a method of deciding to transmit the periodic CSI report of the serving cell of which connectivity group (or in the CSI process of the serving cell in one connectivity group) in each of the subframes, for example, the following methods (E1) and (E2) may be used.

(E1) As illustrated in FIG. 11, the base station device 2-1 or the base station device 2-2 configures an uplink subframe set that corresponds to each of the connectivity groups (for example, an uplink subframe set #0 that corresponds to the connectivity group #0 or an uplink subframe set #1 that corresponds to the connectivity group #1) for the terminal device 1. In a case where more than one uplink subframe set is configured, the terminal device 1 determines which uplink subframe set the subframe for performing the periodic CSI report is included in and drops the periodic CSI report in a case where the connectivity group of the periodic CSI report does not match with the connectivity group of the subframe (unless the connectivity groups match with each other). In a case where the connectivity group of the periodic CSI report matches with the connectivity group of the subframe, the periodic CSI report is transmitted. The base station device 2-1 or the base station device 2-2 does not extract the periodic CSI report in a case where the periodic CSI report is dropped but extracts the periodic CSI report in a case where the periodic CSI report is transmitted.

(E2) The base station device 2-1 or the base station device 2-2 transmits the uplink grant for instructing on PUSCH transmission by the serving cell of any of the connectivity groups to the terminal device 1. In a case where the connectivity group of the periodic CSI report does not match with the connectivity group of the serving cell in which the PUSCH is transmitted by the subframe, the terminal device 1 drops the periodic CSI report. In a case where the connectivity group of the periodic CSI report matches with the connectivity group of the serving cell in which the PUSCH which does not accompany the aperiodic CSI report is transmitted by the subframe, the periodic CSI report is transmitted by using the PUCCH or PUSCH. The base station device 2-1 or the base station device 2-2 does not extract the periodic CSI report in a case where the periodic CSI report is dropped but extracts the periodic CSI report in a case where the periodic CSI report is transmitted.

In a case where the uplink subframe set that corresponds to each of the connectivity groups is configured, with respect to not only the periodic CSI report but also the aperiodic CSI report, the terminal device 1 may drop the aperiodic CSI report unless the connectivity group of the periodic CSI report matches with the connectivity group of the subframe. Here, in a case where any of n kinds of serving cell combinations is indicated by the CSI request field and the connectivity group of the serving cell in the combination does not match with the connectivity group of the subframe for the aperiodic CSI report, the terminal device 1 may transmit only the aperiodic CSI report in the serving cell except the serving cells that do not match. Alternatively, in such a case, the terminal device 1 may drop all the aperiodic CSI reports that are indicated by the CSI request field. Alternatively, the terminal device 1 may avoid assuming reception of the CSI request in which the connectivity group of the serving cell in the combination does not match with the connectivity group of the subframe for the aperiodic CSI report. In this case, the base station device 2-1 or the base station device 2-2 has to indicate the combination that includes only the serving cell which matches with the connectivity group of the subframe for the aperiodic CSI report by using the CSI request field. A case where the CSI process of the serving cell is used instead of the serving cell is similar.

Accordingly, each of the base station devices 2 may directly receive a desired CSI report from the terminal device 1 not via the other base station device 2. Thus, even in a case where the base station devices 2 are mutually connected by the low-speed backhaul, scheduling may be performed by using a timely CSI report.

In the above embodiments, the description has been made about a case where the serving cells are grouped into the connectivity group. However, embodiments are not limited to this. For example, among plural serving cells, only the downlink signals may be grouped, or only the uplink signals may be grouped. In this case, the connectivity identifier is configured for the downlink signals or the uplink signals. Further, the downlink signals and the uplink signals may individually be grouped. In this case, the connectivity identifiers are individually configured for the downlink signals and the uplink signals. Alternatively, the downlink component carriers may be grouped, or the uplink component carriers may be grouped. In this case, the connectivity identifiers are individually configured for the component carriers.

Further, in the above embodiments, the description has been made with the connectivity group. However, the set of the serving cells provided by the same base station device (transmission point) does not necessarily have to be specified by the connectivity group. Instead of the connectivity group, the set of the serving cells may be specified by using the connectivity identifier or the cell index. For example, in a case where the set of the serving cells is specified by the connectivity identifier, the connectivity group in the above embodiments may be, in other words, the set of the serving cells that have the same connectivity identifier. Alternatively, in a case where the set of the serving cells is specified by the cell index, the connectivity group in the above embodiments may be, in other words, the set of the serving cells with the cell index of a prescribed value (or in a prescribed range).

Further, in the above embodiments, the description has been made using primary cell and lead cell. However, those terms do not necessarily have to be used. For example, the primary cell in the above embodiments may also be referred to as master cell, and the lead cell in the above embodiments may also be referred to as primary cell.

A program that operates in the base station device 2-1 or the base station device 2-2 and the terminal device 1 according to the present invention may be a program that controls a central processing unit (CPU) or the like so that functions of the above embodiments according to the present invention are realized (a program that allows a computer to function). In addition, information that is dealt with by those devices is temporarily accumulated in a random access memory (RAM) during processing thereof and thereafter stored in various kinds of read only memories (ROM) such as flash ROMs or hard disk drives (HDD). The information is read out, corrected, and written by the CPU as needed.

A portion of the terminal device 1, the base station device 2-1, or the base station device 2-2 in the above-described embodiments may be realized by a computer. In such a case, a program for realizing the control functions is recorded in a computer-readable recording medium, the program that is recorded in the recording medium is read and executed by a computer system, and the control functions may thereby be realized.

It should be noted that the "computer system" herein is a computer system that is built in the terminal device 1, the base station device 2-1, or the base station device 2-2 and includes an OS and hardware such as peripheral apparatuses. Further, "computer-readable recording media" are portable media such as flexible disks, magneto-optical disks, ROMs, and CD-ROMs and storage devices such as hard disks that are built in the computer system.

In addition, the "computer readable recording media" may include elements that dynamically retain the program for a short period of time like communication wires in a case where the program is transmitted via a network such as the Internet and a communication line such as a telephone line and elements that retain the program for a certain period of time such as volatile memories in the computer systems that are servers or clients in the above case. Further, the program may realize a portion of the above-described functions and may further be realized in combination with a program that has the above-described functions already recorded in the computer system.

Further, the base station device 2-1 or the base station device 2-2 in the above-described embodiments may be realized as an assembly (device group) that is configured with plural devices. Each of the devices that configure the device group may include the function or a portion of or whole the function block of the base station device 2-1 or the base station device 2-2 according to the above-described embodiments. It is sufficient that the device group has the general functions or the general function blocks of the base station device 2-1 or the base station device 2-2. Further, the terminal device 1 according to the above-described embodiments is capable of communicating with the base station device as an assembly.

Further, the base station device 2-1 or the base station device 2-2 in the above-described embodiments may be the Evolved Universal Terrestrial Radio Access Network (EU-TRAN). Further, the base station device 2-1 or the base station device 2-2 in the above-described embodiments may have a portion of or whole the function of a higher node with respect to an eNodeB.

Further, a portion or the whole of the terminal device 1, the base station device 2-1, or the base station device 2-2 in the above-described embodiments may typically be realized as an LSI that is an integrated circuit or may be realized as a chipset. Function blocks of the terminal device 1, the base station device 2-1, or the base station device 2-2 may individually be formed into chips, or a portion of or all the function blocks may be integrated into a chip. Further, a method of forming the integrated circuit is not limited to an LSI, but the integrated circuit may be realized as a dedicated circuit or a general purpose processor. Further, in a case where a technology of forming an integrated circuit that replaces the LSI emerges as a result of progress of a semiconductor technology, an integrated circuit by the technology may be used.

Further, in the above-described embodiments, a cellular mobile station device has been described as one example of the terminal device or a communication device. However, the present invention is not limited to this but may also be applied to terminal devices or communication devices of stationary type or non-portable type electronic apparatuses for indoor or outdoor installation, for example, audio-visual apparatuses, kitchen apparatuses, cleaning or washing apparatuses, air-conditioning apparatuses, office apparatuses, vending machines, other household apparatuses, and so forth.

The embodiments of the present invention have been described with reference to the drawings in the foregoing. However, specific configurations are not limited to the embodiments, and the present invention includes design modifications within a scope that does not depart from the gist of the present invention. Various modifications are possible in the scope recited in claims in the present invention, and embodiments that are obtained by appropriately combining technical means that are disclosed in different embodiments are included in the technical scope of the present invention. Further, embodiments include configurations in which elements that are described in the above embodiments and provide similar effects are mutually substituted.

DESCRIPTION OF REFERENCE NUMERALS 501 higher layer
502 control unit
503 codeword generation unit
504 downlink subframe generation unit
505 downlink reference signal generation unit
506 OFDM signal transmission unit
507 transmit antenna
508 receive antenna
509 SC-FDMA signal reception unit
510 uplink subframe processing unit
511 uplink control information extraction unit
601 receive antenna
602 OFDM signal reception unit
603 downlink subframe processing unit
604 downlink reference signal extraction unit
605 transport block extraction unit
606, 1006 control unit
607, 1007 higher layer
608 channel state measurement unit
609, 1009 uplink subframe generation unit
610 uplink control information generation unit
611, 612, 1011 SC-FDMA signal transmission unit
613, 614, 1013 transmit antenna

The invention claimed is:

1. A terminal device that uses a first serving cell group which is a serving cell group which includes a primary cell, the terminal device comprising:
higher layer control information acquisition circuitry that configures a second serving cell group which is a serving cell group which does not include the primary cell, the second serving cell group associated with a second base station device;
channel state information generation circuitry that calculates periodic channel state information of each of plural serving cells in the primary cell group and the secondary cell group;
uplink control information generation circuitry that,
in one subframe, in a case where first reports of the periodic channel state information of a first plural serving cells in the first serving cell group among the first plural serving cells collide with each other, drops the first reports for all of the first plural serving cells in the first serving cell group except one of the first report of the first serving cell with the smallest cell index among first serving cell indices of the first serving cells, in a case where second reports of the periodic channel state information of a second plural serving cells in the second serving cell group among the second plural serving cells collide with each other, drops the second reports for all of the second plural serving cells in the second serving cell group except one of the second report of the second serving cell with the smallest cell index among serving cell indices of the second serving cells, and generates first uplink control information including the first report and second uplink control information including the second report; and uplink control information transmission circuitry that transmits a first uplink subframe which includes the first uplink control information and transmits a second uplink subframe which includes the second uplink control information, wherein, the first serving cell group associated with a first base station device.

2. The terminal device according to claim 1, wherein the higher layer control information acquisition circuitry acquires higher layer control information and configures the second serving cell group based on the higher layer control information.

3. The terminal device according to claim 1, wherein the plural serving cells include a serving cell(s) that belongs to the first serving cell group and a serving cell(s) that belongs to the second serving cell group.

4. The terminal device according to claim 1, wherein the uplink control information transmission circuitry transmits the uplink subframe that includes the uplink control information on the serving cell with the smallest cell index among indices corresponding to the serving cells which belong to the same serving cell group as the serving cells whose reports of periodic channel state information collide with each other.

5. A base station device that uses a first serving cell group which is a serving cell group which includes a primary cell, the base station device comprising:

a higher layer control information notification circuitry that configures a second serving cell group which is a serving cell group which does not include the primary cell;

an uplink control information reception circuitry that receives an uplink subframe; and an uplink control information extraction circuitry that extracts, from the uplink subframe being received, uplink control information which includes only one report of periodic channel state information among reports of periodic channel state information which collide with each other in a case where reports of the periodic channel state information of two or more serving cells that belong to the first serving cell group collide with each other in the one uplink subframe, the uplink control information extraction circuitry extracts the uplink control information in the uplink subframe of the serving cell with the smallest cell index among the serving cells that belong to the same serving cell group as the serving cells whose reports of periodic channel state information collide with each other, wherein, the base station device being part of the first serving cell group.

6. The base station device according to claim 5, wherein the uplink control information extraction circuitry extracts the uplink control information that includes only the periodic channel state information of the serving cell with the smallest cell index among the serving cells whose reports of the periodic channel state information collide with each other.

7. A communication method that is executed in a terminal device which uses a first serving cell group which is a serving cell group which includes a primary cell, the communication method comprising:

configuring a second serving cell group which is a serving cell group which does not include the primary cell, the second serving cell group associated with a second base station device;

calculating periodic channel state information of each of plural serving cells in the primary cell group and the secondary cell group;

in one subframe, in a case where first reports of the periodic channel state information of a first plural serving cells in the first serving cell group among the first plural serving cells collide with each other, dropping the first reports for all of the first plural serving cells in the first serving cell group except one of the first report of the first serving cell with the smallest cell index among first serving cell indices of the first serving cells in a case where second reports of the periodic channel state information of a second plural serving cells in the second serving cell group among the second plural serving cells collide with each other, dropping the second reports for all of the second plural serving cells in the second serving cell group except one of the second report of the second serving cell with the smallest cell index among serving cell indices of the second serving cells, and, and generating first uplink control information including the first report and second uplink control information including the second report; and transmitting a first uplink subframe which includes the first uplink control information and transmits a second uplink subframe which includes the second uplink control information, wherein, the first serving cell group associated with a first base station device.

8. A communication method that is executed in a base station device which uses a first serving cell group which is a serving cell group which includes a primary cell, the communication method comprising:

configuring a second serving cell group which is a serving cell group which does not include the primary cell;

receiving an uplink subframe; and extracting, from the uplink subframe being received, uplink control information which includes only one piece of periodic channel state information among pieces of periodic channel state information which collide with each other in a case where reports of the periodic channel state information of two or more serving cells that belong to the first serving cell group collide with each other in the one uplink subframe; and extracting the uplink control information in the uplink subframe of the serving cell with the smallest cell index among the serving cells that belong to the same serving cell group as the serving cells whose reports of periodic channel state information collide with each other, wherein, the base station device being part of the first serving cell group.

* * * * *